US00RE46810E

(19) United States
(12) Reissued Patent
Jin et al.

(10) Patent Number: US RE46,810 E
(45) Date of Reissued Patent: Apr. 24, 2018

(54) SYSTEM AND METHOD FOR TRANSPORT BLOCK SIZE DESIGN FOR MULTIPLE-INPUT, MULTIPLE-OUTPUT (MIMO) IN A WIRELESS COMMUNICATIONS SYSTEM

(71) Applicant: Futurewei Technologies, Inc., Plano, TX (US)

(72) Inventors: Ying Jin, Shanghai (CN); Yufei Blankenship, Kildeer, IL (US)

(73) Assignee: FUTUREWEI TECHNOLOGIES, INC., Plano, TX (US)

(21) Appl. No.: 14/856,224

(22) Filed: Sep. 16, 2015

Related U.S. Patent Documents

Reissue of:
(64) Patent No.: 8,537,750
Issued: Sep. 17, 2013
Appl. No.: 12/791,669
Filed: Jun. 1, 2010

U.S. Applications:
(60) Provisional application No. 61/219,321, filed on Jun. 22, 2009, provisional application No. 61/183,481, filed on Jun. 2, 2009.

(51) Int. Cl.
*H04W 4/00* (2009.01)
*H04L 27/00* (2006.01)

(52) U.S. Cl.
CPC ..... *H04L 27/0008* (2013.01)

(58) Field of Classification Search
None
See application file for complete search history.

(56) References Cited

U.S. PATENT DOCUMENTS 6,775,254 B1 * 8/2004 Willenegger et al. ..... 370/329
7,496,074 B2 * 2/2009 Hepler ..... H04B 1/0067 370/335

(Continued)

FOREIGN PATENT DOCUMENTS

CN 101197611 A 6/2008
CN 101384072 A 3/2009

(Continued)

OTHER PUBLICATIONS

3GPP "3GPP TS 36.212 V8.2.0 (Mar. 2008)", Mar. 2008.*

(Continued)

*Primary Examiner* — Luke S Wassum
(74) *Attorney, Agent, or Firm* — Slater Matsil, LLP

(57) ABSTRACT

In one embodiment, a method for transmitting information includes processing a downlink transport channel to generate a transport block (TB) having a TB size. The TB size is selected by selecting a modulation and coding scheme index ($I_{TBS}$) and a physical resource block index ($N_{PRB}$). The TB size for the selected $I_{TBS}$ and $N_{PRB}$ is selected so that an effective code rate at an user equipment (UE) does not exceed a specified threshold. The effective code rate is defined as a number of downlink (DL) information bits including TB cyclic redundancy check (CRC) bits and code block CRC bits divided by a number of physical channel bits on Physical Downlink Shared Channel (PDSCH). The transport block is mapped to multiple spatial layers. The number of spatial layers N is greater than or equal to three. The multiple spatial layers are transmitted to the UE.

43 Claims, 7 Drawing Sheets

(56) References Cited

U.S. PATENT DOCUMENTS

| | | | | |
|---|---|---|---|---|
| 2004/0014447 | A1* | 1/2004 | Hepler | H04B 1/0067 455/258 |
| 2010/0254331 | A1* | 10/2010 | Kim | H04L 1/0026 370/329 |
| 2010/0296603 | A1* | 11/2010 | Lee | H04L 1/0071 375/295 |

FOREIGN PATENT DOCUMENTS

| | | | |
|---|---|---|---|
| KR | 20030067412 | A | 8/2003 |
| KR | 20030079631 | A | 10/2003 |

OTHER PUBLICATIONS

3rd Generation Partnership Project; Technical Specification Group Radio Access Network; Requirements for further advancements for Evolved Universal Terrestrial Radio Access (E-UTRA) (LTE-Advanced)(Relase 8), 3GPP TR 36.913 V8.0.1, Mar. 2009, 15 pages.

3rd Generation Partnership Project; Technical Specification Group Radio Access Network; Evolved Universal Terrestrial Radio Access (E-UTRA); Physical Channels and Modulation (Release 8), 3GPP TS 36.211 V8.6.0, Mar. 2009, 83 pages.

3rd Generation Partnership Project; Technical Specification Group Radio Access Network; Evolved Universal Terrestrial Radio Access (E-UTRA); Multiplexing and channel coding (Release 8), 3GPP TS 36.212 V8.6.0, Mar. 2009, 59 pgs.

3rd Generation Partnership Project; Technical Specification Group Radio Access Network; Evolved Universal Terrestrial Radio Access (E-UTRA); Physical layer procedures (Release 8), 3GPP TS 36.213 V8.6.0, Mar. 2009, 77 pages.

3rd Generation Partnership Project; Technical Specification Group Radio Access Network; Evolved Universal Terrestrial Radio Access (E-UTRA); Physical layer procedures (Release 8), 3GPP TS 36.213 V8.7.0, May 2009, 77 pages.

International Search Report with Written Opinion of the International Searching Authority and Translation received in Patent Cooperation Treaty Application No. PCT/CN2010/073456, dated Sep. 9, 2010, 10 pages.

Motorola, et al., "Remaining details of MCS/TBS Signalling," 3GPP TSG RAN1#53 R1-082211, Kansas City, MO, USA, May 5-9, 2008, 4 pgs.

Ericsson, et al., "Remaining Issues with TBS & MCS Settings," TSG-RAN WG1 #53bis R1-082719, Warsaw, Poland, Jun. 30-Jul. 4, 2008, 5 pgs.

Motorola, "TBS and MCS Signaling and Tables," 3GPP TSG RAN1 #52bis R1-081638, Shenzhen, China, Mar. 31-Apr. 4, 2008, 14 pgs.

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.6.0, Mar. 2009, 59 pages.

* cited by examiner

SYSTEM AND METHOD FOR TRANSPORT BLOCK SIZE DESIGN FOR MULTIPLE-INPUT, MULTIPLE-OUTPUT (MIMO) IN A WIRELESS COMMUNICATIONS SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. Provisional Application No. 61/183,481, filed on Jun. 2, 2009, entitled "System and Method for Transport Block Size Design for Downlink Multiple-Input, Multiple-Output (MIMO) in a Wireless Communications System," and U.S. Provisional Application No. 61/219,321 filed on Jun. 22, 2009, entitled "Transport Block Size Design for LTE-A Uplink MIMO," which applications are hereby incorporated herein by reference.

TECHNICAL FIELD

The present invention relates generally to wireless communication, and more particularly to a system and method for transport block size (TBS) design for MIMO in a wireless communication system.

BACKGROUND

The Third Generation Partnership Project (3GPP) has decided that Evolved Universal Mobile Telecommunications System (UMTS) Terrestrial Radio Access (E-UTRA) evolve in future releases in order to meet 3GPP operator requirements for the evolution of E-UTRA and a need to meet/exceed the capabilities of International Mobile Telecommunications (IMT) Advanced. Accordingly, Long Term Evolution (LTE) is in the progress of evolving to LTE-Advanced.

Changes in LTE-Advanced over LTE include a target peak data rate for a downlink (DL) to be about 1 Gbps for LTE-Advanced as compared to 100 Mbps for LTE. In order to support such high data rates, DL spatial multiplexing with up to eight layers is considered for LTE-Advanced (see 3GPP TR 36.814 V0.4.1(2009-02), "Further Advancements for E-UTRA; Physical Layer Aspects; (Release 9), which is incorporated herein by reference), while in LTE, DL spatial multiplexing with up to four layers is available. As a result, changes may have to be made to facilitate the higher layer DL spatial multiplexing for LTE-Advanced, such as redesigning control signaling, reference signal patterns, transport block size per DL component carrier, and so forth.

As specified in LTE-Advanced, in the DL 8-by-X single user spatial multiplexing, up to two transport blocks may be transmitted to a scheduled User Equipment (UE) in a subframe per DL component carrier. Each transport block may be assigned its own modulation and coding scheme.

With an increase in the number of supported layers for DL spatial multiplexing in LTE-advanced, a new codeword-to-layer mapping needs to be designed to accommodate the larger number of layers (eight as opposed to four). Furthermore, the size of the transport blocks may be significantly increased for the allocated resource blocks.

For uplink, the target peak data rate is 50 Mb/s in LTE system, but for LTE-Advanced the target peak data rate of uplink is increased to 500 Mb/s. Uplink spatial multiplexing of up to four layers is considered for LTE-Advanced to support the higher data rates according to 3GPP TR 36.814 V0.4.1(2009-02), "Further Advancements for E-UTRA; Physical Layer Aspects; (Release 9)," which is incorporated herein by reference. In contrast only a single layer is used for LTE uplink. Therefore, many changes have to be made to facilitate the higher layer uplink spatial multiplexing for LTE-Advanced, such as redesigning control signaling, reference signal patterns, transport block size per uplink component carrier, and so on.

Hence, transport block size design for uplink and downlink are needed for increasing peak data rate in uplink and downlink transmission.

SUMMARY OF THE INVENTION

These and other problems are generally solved or circumvented, and technical advantages are generally achieved, by embodiments of a system and method for transport block size design for downlink MIMO in a wireless communication system.

In accordance with an embodiment, a method for transmitting information comprises processing a downlink transport channel to generate a transport block (TB) having a TB size. The TB size is selected by selecting a modulation and coding scheme index ($I_{TBS}$) and a physical resource block index ($N_{PRB}$). The TB size for the selected $I_{TBS}$ and $N_{PRB}$ is selected so that an effective code rate at a user equipment (UE) does not exceed a specified threshold. The effective code rate is defined as a number of downlink (DL) information bits including TB cyclic redundancy check (CRC) bits and/or code block CRC bits divided by a number of physical channel bits on Physical Downlink Shared Channel (PDSCH). The transport block is mapped to multiple spatial layers. The number of spatial layers N is greater than or equal to three. The multiple spatial layers are transmitted to the UE.

In another embodiment, a method for transmitting information comprises processing a uplink transport channel to generate a transport block (TB) having a TB size. The TB size is selected by selecting a modulation and coding scheme index ($I_{TBS}$) and a physical resource block index ($N_{PRB}$). The TB size for the $I_{TBS}$ and the $N_{PRB}$ is selected so that the number of code blocks in the TB size is one (1) or a multiple of a number of spatial layers N. The transport block is mapped to the N spatial layers, and the N spatial layers transmitted to a receiver.

In an alternative embodiment, a communications device comprises a transmitter to be coupled to at least one transmit antenna. The transmitter is configured to transmit signals with the at least one transmit antenna. A transport channel processing unit is coupled to a processor. The transport channel processing unit is configured to provide transport channel processing to a transport block (TB) provided by the processor. The TB size of the TB is selected by selecting a modulation and coding scheme index ($I_{TBS}$) and a physical resource block index ($N_{PRB}$), and setting the TB size for the selected $I_{TBS}$ and $N_{PRB}$ so that the effective code rate at a user equipment (UE) does not exceed a specified threshold. The effective code rate is defined as the number of downlink (DL) information bits including TB cyclic redundancy check (CRC) bits and code block CRC bits divided by the number of physical channel bits on Physical Downlink Shared Channel (PDSCH). A physical channel processing unit is coupled to the transmitter. The physical channel processing unit is configured to provide physical channel processing to a plurality of transport blocks provided by the transport channel processing unit.

In yet another, a communications device comprises a transmitter to be coupled to at least one transmit antenna. The transmitter is configured to transmit signals with the at least one transmit antenna. A transport channel processing unit is coupled to a processor. The transport channel processing unit is configured to provide transport channel processing to a transport block (TB) provided by the processor. The TB size of the TB is selected by selecting a modulation and coding scheme index ($I_{TBS}$) and a physical resource block index ($N_{PRB}$), and selecting the TB size for the $I_{TBS}$ and $N_{PRB}$ so that the number of code blocks in the TB size is one (1) or a multiple of a number of spatial layers N. A channel interleaver is coupled to the transport channel processing unit. The channel interleaver is configured to interleave modulation symbols of a plurality of transport blocks. A physical channel processing unit is coupled to the channel interleaver and to the transmitter. The physical channel processing unit is configured to provide physical channel processing to the interleaved modulation symbols provided by the channel interleaver.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 5, which includes FIGS. 5a and 5b, illustrates mapping a transport block to multiple uplink layers, wherein FIG. 5a illustrates mapping of a transport block having two code blocks to two layers, and wherein FIG. 5b illustrates mapping of a transport block having three code blocks to three layers, in accordance with embodiments of the invention.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution Advanced (LTE-Advanced) communications system. The invention may also be applied, however, to other communications systems, such as UMB, WiMAX compliant communications systems, that support transport block (TB) mapping to multiple MIMO layers, both uplink (UL) and downlink (DL). Therefore, the discussion of LTE and LTE-Advanced wireless communications systems should not be construed as being limiting to either the scope or the spirit of the embodiments.

In 3GPP LTE and LTE-Advanced compliant communications systems, data from upper network layers arrive at a physical layer as transport blocks (TBs). At each transmission instance (for example, a subframe in LTE), up to two TBs may be scheduled. At the physical layer, each TB undergoes processing such as channel coding, rate matching, scrambling, modulation, before it is mapped to MIMO layers and sent out from the antennas. In LTE, the set of code bits/modulation symbols corresponding to a TB is called a MIMO codeword. Conceptually, the codeword refers to a TB and may be used interchangeably.

In accordance with embodiments of the invention, a downlink transport block size design will be first described, followed by an uplink transport block design.

Figure 1:
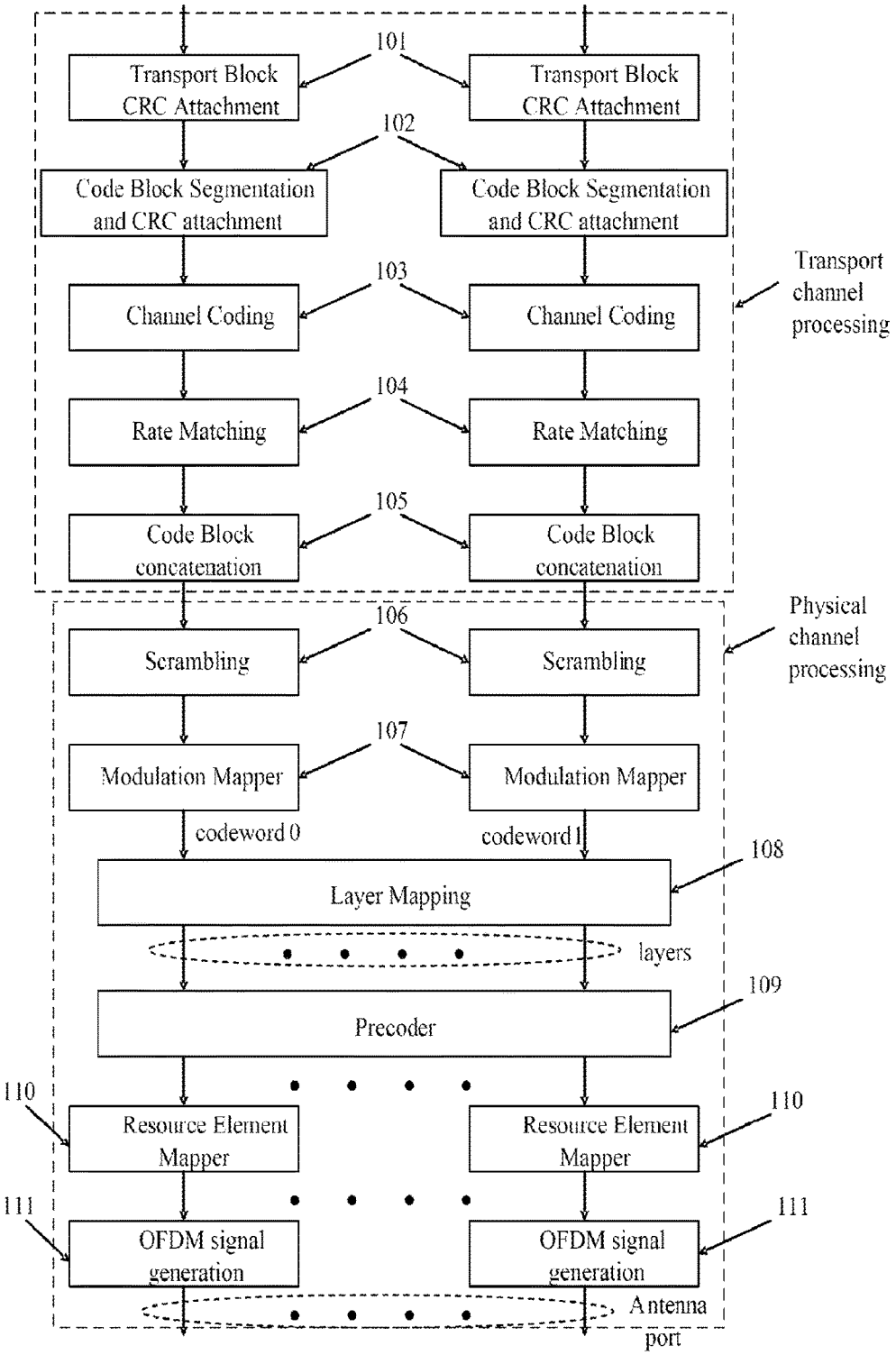
FIG. 1 is a flow diagram of LTE Advanced downlink physical layer processing.

FIG. 1 is a flow diagram of LTE-Advanced downlink physical layer processing.

As illustrated in FIG. 1, up to two transport blocks (TB) are input and for each TB, a cyclic redundancy check (CRC) is attached to the TB at Transport block CRC attachment unit 101. If the size of the TB is larger than a preset threshold, Code block segmentation and Code block CRC attachment unit 102 is used to split the TB into multiple code blocks (CB) and a CRC is attached to each CB. If the TB is not larger than the preset threshold, then the TB may not be split into multiple CBs and the output of unit 101 are sent to unit 103.

Then, each CB is turbo-encoded in Channel Coding unit 103. In Rate matching unit 104, the coded bits of each CB is interleaved and the redundancy version (RV) for hybrid automatic repeat request (HARM) is obtained from high layer signaling. The CBs may be concatenated in a Code block concatenation unit 105 and the coded symbols to be transmitted is scrambled in a Scrambling unit 106 to randomize the transmission bits. The transport block size is defined within the transport channel processing within steps 101-105 and no further definition of the transport block size occurs during steps 106 and beyond.

Before mapping codewords to layers, the scrambled bits may be modulated into complex-valued symbols using Quadrature Phase Shift Keying (QPSK), 16 Quadrature Amplitude Modulation (QAM) or 64QAM in a Modulation Mapper unit 107. The complex-valued modulation symbols for each codeword to be transmitted are mapped onto one or several layers in a Layer Mapping unit 108. While, a Precoder unit 109 takes as input the vector comprising one symbol from each layer and generates a block of vector to be mapped onto resources on each of the antenna ports.

In a Resource Element Mapper unit 110, the precoded symbols are mapped into time-frequency domain resource element of each antenna port and then converted to orthogonal frequency division multiplexing (OFDM) baseband signal in an OFDM signal generation unit 111. The baseband signal is then upconverted to a carrier frequency for each antenna port.

There may be several combinations of codeword-to-layer mapping in LTE. Codeword-to-layer mapping is discussed herein in the context of spatial multiplexing.

Let $M_{symbol}^{layer}$ denote a number of modulation symbols per layer transmitted in a LTE subframe. Due to the parallel nature of the multiple antenna techniques used, the same number of modulation symbols are transmitted in each layer. Let $M_{symbol}^{q}$, $q\in\{1,2\}$ be a total number of modulation symbols per transport block q. When the modulation symbols for each of the code words are mapped onto a layer, $M_{symbol}^{layer}=M_{symbol}^{q}$, $q\in\{1,2\}$.

When the modulation symbols for a codeword are mapped onto two layers, the number of antenna ports must be four (see 3GPP TS 36.211 V8.6.0 (2009-03), "Physical Channels and Modulation (Release 8), which is incorporate herein by reference).

Figure 2A:
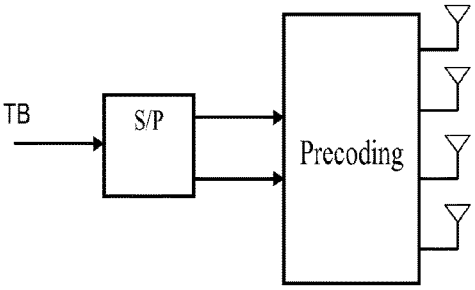
FIGS. 2a through 2c are diagrams of three cases of transmit blocks (TBs) to downlink layer mappings, with a number of downlink layers being equal to two (FIG. 2a), three (FIG. 2b), and four (FIG. 2c), where a single TB is mapped to two layers.
Figure 2B:
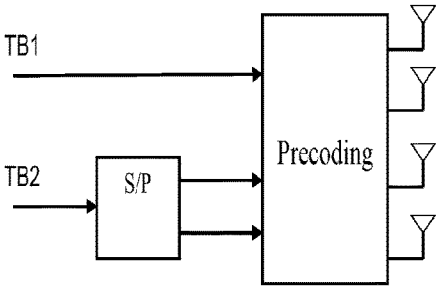
Figure 2C:
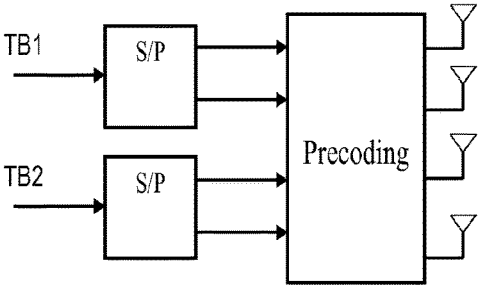

FIGS. 2a through 2c are diagrams of three cases of transmit blocks (TBs) to downlink layer mappings, with a number of downlink layers being equal to two (FIG. 2a), three (FIG. 2b), and four (FIG. 2c). In FIG. 2, a single TB is mapped to two layers.

FIG. 2a illustrates a single transport block (TB) mapped onto two layers, wherein after codeword-to-layer mapping, $M_{symbol}^{layer}=M_{symbol}^{1}/2$. FIG. 2b illustrates two transport blocks mapped onto three layers, wherein after codeword-to-layer mapping, $M_{symbol}^{layer}=M_{symbol}^{1}=M_{symbol}^{2}/2$. FIG. 2c illustrates two transport blocks mapped onto four layers, wherein after codeword-to-layer mapping, $M_{symbol}^{layer}=M_{symbol}^{1}/2=M_{symbol}^{2}/2$.

Figure 3A:
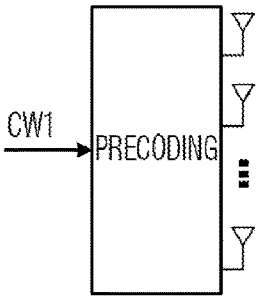
FIGS. 3a through 3k are diagrams of codeword-to-layer mappings in LTE-Advanced.
Figure 3B:
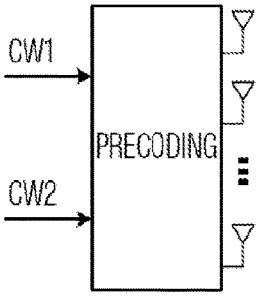
Figure 3D:
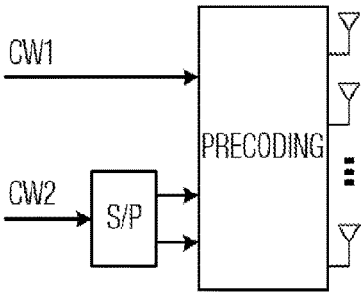
Figure 3C:
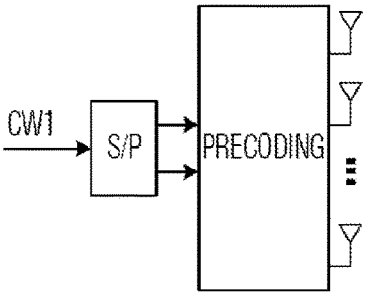
Figure 3E:
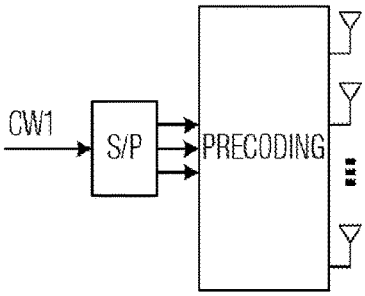
Figure 3F:
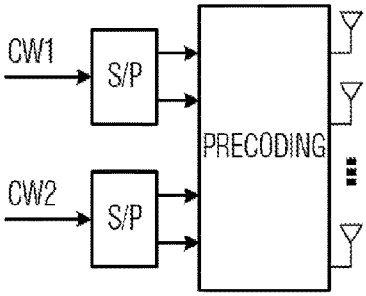
Figure 3G:
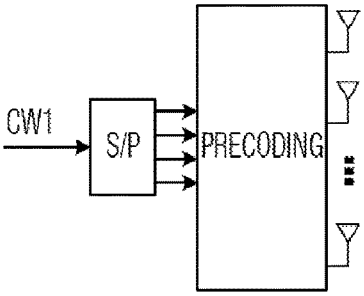
Figure 3H:
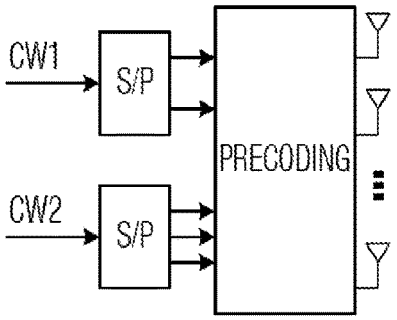
Figure 3I:
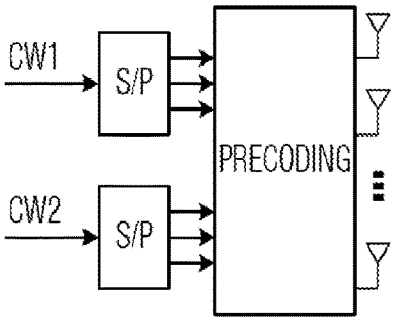
Figure 3J:
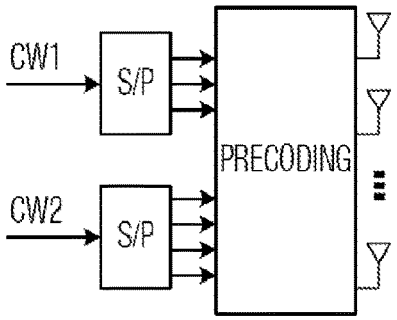
Figure 3K:
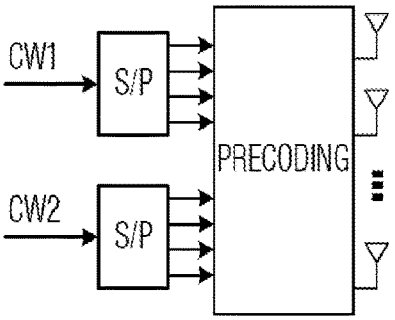

FIG. 3, which includes FIGS. 3a-3k illustrates codeword-to-layer mappings in LTE-Advanced, wherein FIGS. 3c, 3e, and 3g illustrate single codeword retransmissions when an initial transmission comprises more than one codeword. In LTE-Advanced, DL spatial multiplexing of up to eight layers is considered. In order to avoid increasing the uplink (UL) overhead without a significant loss in performance, up to two transport blocks (TBs) can be transmitted to a scheduled UE in a subframe per DL component carrier.

As illustrated in FIGS. 3a-3k, codeword one (CW1) is a modulation symbol sequence corresponding to TB one (TB1). Similarly, codeword two (CW2) is a modulation symbol sequence corresponding to TB two (TB2). There is a one-to-one relationship between a TB and its modulation symbol sequence, given the modulation order and code rate. Although the transport blocks (e.g., TB1, TB2) are not directly mapped to the spatial layers, rather the modulation symbol sequence (e.g., CW1, CW2) are mapped to the spatial layers, it is understood that in discussion of mapping to spatial layers, CW1 and TB1 may be used interchangeably, and CW2 and TB2 may be used interchangeably. There are one-layer TBs, two-layer TBs (i.e., one TB mapped to two layers), three-layer TBs (i.e., one TB mapped to three layers), and four-layer TBs (i.e., one TB mapped to four layers) in LTE-Advanced.

In particular, a TB may be mapped to three layers or four layers when spatial multiplexing of five to eight layers is used for transmission (as illustrated in FIGS. 3h through 3k). For example, for the five layer (FIG. 3h) and seven layer (FIG. 3j) situations, the following relationships exist:

For five layers, TB1 is mapped to two layers and TB2 is mapped to three layers, thus, $M_{symbol}^{layer}=M_{symbol}^{1}/2=M_{symbol}^{2}/3$.

For seven layers, TB1 is mapped to three layers and TB2 is mapped to four layers, thus, $M_{symbol}^{layer}=M_{symbol}^{1}/3=M_{symbol}^{2}/4$. Similar relationships exist for six layer and eight layer situations.

One-layer TB sizes and two-layer TB sizes, as defined for LTE, are being reused in LTE-Advanced. One-layer TB size table and two-layer TB size table are defined in LTE (see 3GPP TS 36.213 V8.6.0 (2009-03), "Physical layer procedures (Release 8), which is incorporated herein by reference), with a first being a one-layer TB size (TBS) table of size 27×110, referred to as a one-layer TBS table, and a second being a one-layer to two-layer TBS translation table, referred to as a two-layer TBS table. Design principles for one-layer TB sizes and two-layer TB sizes in LTE are described in detail below (see 3GPP TS 36.212 V8.6.0 (2009-03), "Multiplexing and channel coding (Release 8);" 3GPP TS 36.213 V8.6.0 (2009-03), "Physical layer procedures (Release 8);" R1-081638, "TBS and MCS Signalling and Table;" R1-082211,—"Remaining details of MCS/TBS signaling;" and R1-082719, "Remaining Issues with TBS & MCS Settings;" which are incorporated herein by reference).

Several factors are taken into consideration in designing the one-layer TB sizes. First, in order to avoid padding and reduce receiver complexity, the one-layer TB sizes are defined so that the code block sizes, with transport block CRC bits and code block CRC bits attached, are aligned with Quadratic Permutation Polynomial (QPP) sizes for turbo codes.

Second, some preferred Media Access Control (MAC) sizes should be contained for system requirements in designing one-layer TB sizes, such as 16, 24, 40, 56, 72, 104, 120, 152, 296, 344, 392, 440, 488, and 536 bits.

Third, one-layer TB sizes are computed from the Modulation and Coding Scheme (MCS) table using the reference configuration of one (1) Orthogonal Frequency Division Multiplexed (OFDM) symbol for control region and the four antenna ports configuration. The one-layer TBS table is invariant of control region sizes and antenna configurations.

Fourth, the UE may be unable to decode if the effective code rate is greater than 1. In particular, since the UE may skip decoding a TB in an initial transmission if the effective code rate is higher than 0.930, this factor should be considered for designing TB sizes with higher modulation orders, where the effective code rate is defined as the number of DL information bits (including TB CRC bits and code block CRC bits) divided by the number of physical channel bits on Physical Downlink Shared Channel (PDSCH).

Fifth, every one-layer TB size should occur with sufficient number of times, thus providing the desired flexibility in (re)transmission schedule.

Sixth, the one-layer TB sizes with highest MCS level for every allocated physical resource blocks lead to consistent peak rate scaling across different bandwidths.

The one-layer TB sizes may be designed with consideration of the above listed factors and placed in tabular form, wherein a row index $I_{TBS}$ is obtained from the MCS table and a column index $N_{PRB}$ denotes the number of allocated physical resource blocks.

For $1\leq N_{PRB}\leq 110$, the TB size (TBS) may be given by $(I_{TBS}, N_{PRB})$ entry of the one-layer TBS table. The size of the one-layer TBS table used in LTE is 27×110, wherein each of the 27 rows corresponds to a distinct spectral efficiency, and each of the 110 columns corresponds to a given number of physical resource blocks (RB).

To signal the transmit format, including the TB size of a TB, Downlink Control Information (DCI) is used which contains a 5-bit MCS field. The MCS field points to the 32 rows in the MCS table. In the MCS table, three MCS states are reserved for signaling modulation orders for retransmission, and two overlapped MCSs for transitioning from QPSK to 16-QAM, and from 16-QAM to 64-QAM, respectively. Thus there are 27 distinct spectral efficiency levels (i.e., MCS levels), corresponding to the 27 rows of the one-layer TBS table. With the MCS field and the RB allocation, the TB size is obtained by looking up the 27×110 one-layer TBS table.

For a given combination of resources blocks and spectral efficiency, two-layer TB sizes are two times one-layer TB sizes in principle with some adjustment given for CRC bits. Most two-layer TB sizes occur in the one-layer TBS table, thus providing the desired flexibility in (re)transmission schedule.

A method for obtaining the two-layer TBS table based on the one-layer TBS table is described as follows.

First, for $1 \leq N_{PRB} \leq 55$, the two-layer transport block sizes are given by the $(I_{TBS}, 2 \cdot N_{PRB})$ entry of the one-layer TBS table. Second, for $56 \leq N_{PRB} \leq 110$, a baseline TBS_L1 is taken from the $(I_{TBS}, N_{PRB})$ entry of one-layer TBS table, which is then translated into TBS_L2 using the mapping rule shown in Table 1 below. The two-layer transport block sizes are given by TBS_L2.

Although the two-layer TB sizes are defined by two categories above, collectively an equivalent 27×110 two-layer TB sizes is effectively defined, similar to the explicitly defined 27×110 one-layer TB size table.

TABLE 1

One-layer to two-layer transport block sizes translation table

| TBS_L1 | TBS_L2 |
|---|---|
| 1544 | 3112 |
| 1608 | 3240 |
| 1672 | 3368 |
| 1736 | 3496 |
| 1800 | 3624 |
| 1864 | 3752 |
| 1928 | 3880 |
| 1992 | 4008 |
| 2024 | 4008 |
| 2088 | 4136 |
| 2152 | 4264 |
| 2216 | 4392 |
| 2280 | 4584 |
| 2344 | 4776 |
| 2408 | 4776 |
| 2472 | 4968 |
| 2536 | 5160 |
| 2600 | 5160 |
| 2664 | 5352 |
| 2728 | 5544 |
| 2792 | 5544 |
| 2856 | 5736 |
| 2984 | 5992 |
| 3112 | 6200 |
| 3240 | 6456 |
| 3368 | 6712 |
| 3496 | 6968 |
| 3624 | 7224 |
| 3752 | 7480 |
| 3880 | 7736 |
| 4008 | 7992 |
| 4136 | 8248 |

TABLE 1-continued

One-layer to two-layer transport block sizes translation table

| TBS_L1 | TBS_L2 |
|---|---|
| 4264 | 8504 |
| 4392 | 8760 |
| 4584 | 9144 |
| 4776 | 9528 |
| 4968 | 9912 |
| 5160 | 10296 |
| 5352 | 10680 |
| 5544 | 11064 |
| 5736 | 11448 |
| 5992 | 11832 |
| 6200 | 12576 |
| 6456 | 12960 |
| 6712 | 13536 |
| 6968 | 14112 |
| 7224 | 14688 |
| 7480 | 14688 |
| 7736 | 15264 |
| 7992 | 15840 |
| 8248 | 16416 |
| 8504 | 16992 |
| 8760 | 17568 |
| 9144 | 18336 |
| 9528 | 19080 |
| 9912 | 19848 |
| 10296 | 20616 |
| 10680 | 21384 |
| 11064 | 22152 |
| 11448 | 22920 |
| 11832 | 23688 |
| 12216 | 24496 |
| 12576 | 25456 |
| 12960 | 25456 |
| 13536 | 27376 |
| 14112 | 28336 |
| 14688 | 29296 |
| 15264 | 30576 |
| 15840 | 31704 |
| 16416 | 32856 |
| 16992 | 34008 |
| 17568 | 35160 |
| 18336 | 36696 |
| 19080 | 37888 |
| 19848 | 39232 |
| 20616 | 40576 |
| 21384 | 42368 |
| 22152 | 43816 |
| 22920 | 45352 |
| 23688 | 46888 |
| 24496 | 48936 |
| 25456 | 51024 |
| 26416 | 52752 |
| 27376 | 55056 |
| 28336 | 57336 |
| 29296 | 59256 |
| 30576 | 61664 |
| 31704 | 63776 |
| 32856 | 66592 |
| 34008 | 68808 |
| 35160 | 71112 |
| 36696 | 73712 |
| 37888 | 76208 |
| 39232 | 78704 |
| 40576 | 81176 |
| 42368 | 84760 |
| 43816 | 87936 |
| 45352 | 90816 |
| 46888 | 93800 |
| 48936 | 97896 |
| 51024 | 101840 |
| 52752 | 105528 |
| 55056 | 110136 |
| 57336 | 115040 |

TABLE 1-continued

| One-layer to two-layer transport block sizes translation table | |
|---|---|
| TBS_L1 | TBS_L2 |
| 59256 | 119816 |
| 61664 | 124464 |
| 63776 | 128496 |
| 66592 | 133208 |
| 68808 | 137792 |
| 71112 | 142248 |
| 73712 | 146856 |
| 75376 | 149776 |

A three-layer table may be designed in accordance with an embodiment of the invention as described below. In various embodiments, three-layer TB sizes are defined so that the code block sizes, with TB CRC bits and code block CRC bits attached, are aligned with QPP sizes for turbo codes. The three-layer TB sizes are about three times one-layer TB sizes with adjustment given for CRC bits. Advantageously, most three-layer transport block sizes occur in the one-layer TBS table and the two-layer TBS table, thus providing the desired flexibility in (re)transmission schedule. Since the UE may skip decoding a TB in an initial transmission if the effective code rate is higher than 0.930, the effective code rates should be smaller than 0.930. This should be particularly considered for the highest spectral efficiency, i.e., $I_{TBS}=26$.

To be able to calculate the effective code rates, the system configurations for up to eight layers in LTE-Advanced is discussed below in accordance with embodiments of the invention. The number of resource elements for data transmission is estimated, based on which the effective code rates can then be obtained.

In 3GPP 56bis, there are two kinds of reference signals, a Channel State Information-Reference Signal (CSI-RS) for measurement and a Demodulation-Reference Signal (DM-RS) for demodulation. For CSI-RS, the periodicity of its transmissions may be specified in terms of an integer number of subframes. For rank three through eight transmissions, a maximum of 24 Resource Elements (Res) (total) is assigned to DM-RS in each Resource Block (RB).

Therefore, assuming one OFDM symbol is used for the control region, eight REs per RB for LTE cell-specific RS (i.e., one antenna port for cell-specific RS), and 24 REs per RB for demodulation reference signals, the effective code rate can be calculated as follows:

$$R_{eff}=(TBS+24+N_{CB}\times 24)/(N_{PRB}\times((168-10-8-24)\times N_{layer}\times Q_m)), \quad (1)$$

considering the specific layout of a RB in 3GPP LTE and LTE-Advanced system. In equation (1), TBS denotes the transport block size, $N_{CB}$ denotes the number of codeblocks in the transport block, $N_{layer}$ denotes the number of spatial layers that the TB is mapped to, $Q_m$ denotes the modulation order which can be obtained from the MCS table. In the numerator of equation (1), the two instances of 24 refer to the length-24 codeblock-level CRC, and the length-24 TB-level CRC, respectively. In the denominator of equation (1), 168 is the total number of REs in a RB assuming a normal cyclic prefix; 10 is the number of REs for downlink control in a RB; 8 is the number of REs for LTE cell-specific reference signals assuming one antenna port; and 24 is the number of DM-RS in a RB. In equation (1), the CSI-RS is not considered since it is sparse and most subframes are not expected to contain CSI-RS. Equation (1) will be used to calculate the effective code rates in the transport block size design. Note that equation (1) ignores the scenario where a TB is composed of a single CB, and only considers the scenario where a TB is composed of multiple CBs. This is acceptable since most TB sizes have multiple CBs when it is mapped to multiple layers.

For $I_{TBS}=26$, the DL target spectral efficiency is 5.55, which is a combination of 64-QAM with code rate 0.9250. With REs taken out for RS and control region, it is found that the effective code rate of a TB mapped to three layers is higher than 0.930 if the $I_{TBS}=26$ sizes in the one-layer TBS table are scaled three times.

Therefore, in various embodiments, the three-layer TB sizes can be divided into two parts within the row index and two parts within the column index $N_{PRB}$. Each of the four parts are designed independently.

First, for $0\le I_{TBS}\le 25$, the three-layer TB sizes are three times the one-layer TB sizes in principle with some adjustment given for CRC bits.

For $1\le N_{PRB}\le 36$ and $0\le I_{TBS}\le 25$, where $36=\lfloor 110/3\rfloor$, the three-layer TB sizes are given by the $(I_{TBS},3\cdot N_{PRB})$ entry of the one-layer TBS table. This is because for $1\le N_{PRB}\le 36$ and $0\le I_{TBS}\le 25$, the effective code rates for every MCS levels are less than 0.930 if the scaled one-layer table is used. Therefore, in various embodiments, for $1\le N_{PRB}\le 36$ and $0\le I_{TBS}\le 25$, the three-layer TB sizes are given by the $(I_{TBS}, 3\cdot N_{PRB})$ entry of the one-layer TBS table.

Second, for $I_{TBS}=26$, the three-layer TB sizes are determined so that the effective code rate is 0.930 or slightly lower. Similarly, for $1\le N_{PRB}\le 36$ and $I_{TBS}=\le 26$, many of the effective code rates are found to be higher than 0.930 if the $(I_{TBS},3\cdot N_{PRB})$ entry of the one-layer TBS table is used. Thus the TB sizes are redesigned so that the effective code rates calculated based on Equation (1), with $N_{layer}=3$ and $Q_m=6$ (64-QAM), should be smaller than 0.930. The final TB sizes for $1\le N_{PRB}\le 36$ and $I_{TBS}=26$ is shown in Table 2. In Table 2, for each $N_{PRB}$, two candidate TBS values are provided; the larger value is listed in the row labelled 26, and the smaller of the two is listed in the row labelled 26'. If only one candidate TBS value is provided for a $N_{PRB}$, then the value is used in both row 26 and row 26'.

For each $_{NPRB}$, either TBS candidate (in row 26 or row 26') may be used. It is preferable to use the larger value in row 26, so that a slightly higher efficiency may be achieved. Alternatively, in some embodiments, the smaller value in the row 26' can be used, so that the TB can be received with relatively higher reliability. In some embodiments, it is also possible to use values in row 26 for a subset of the $_{NPRB}$, and use values in row 26' for the rest. In various embodiments, all the TBS values in Table 2 are chosen from the existing values for the one-layer and the equivalent two-layer TBS table. This allows flexible scheduling for the (re)transmission of a TB size. However, in some embodiments, one of the two candidate values listed in Table 2 may be preselected, e.g., by the telecommunication operator.

TABLE 2

Three-layer transport block sizes table with $1 \leq N_{PRB} \leq 36$ and $I_{TBS} = 26$ in accordance with an embodiment of the invention.

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 26 | 2024 | 4136 | 6200 | 8248 | 10296 | 12216 | 14112 | 16416 | 18336 | 20616 |
| 26' | 1992 | 4008 | 5992 | 7992 | 9912 | 11832 | 13536 | 15840 | 17568 | 19848 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 26 | 22920 | 24496 | 26416 | 29296 | 30576 | 32856 | 35160 | 36696 | 39232 | 40576 |
| 26' | 22152 | 23688 | 25456 | 28336 | 29296 | 31704 | 34008 | 35160 | 37888 | 39232 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 26 | 43816 | 45352 | 46888 | 48936 | 51024 | 52752 | 55056 | 57336 | 59256 | 61664 |
| 26' | 42368 | 43816 | 45352 | 46888 | 48936 | 51024 | 52752 | 55056 | 57336 | 59256 |

| | $N_{PRB}$ | | | | | |
|---|---|---|---|---|---|---|
| $I_{TBS}$ | 31 | 32 | 33 | 34 | 35 | 36 |
| 26 | 63776 | 66592 | 68808 | 71112 | 71112 | 75376 |
| 26' | 61664 | 63776 | 66592 | 68808 | 68808 | 75376 |

Additionally, for $37 \leq N_{PRB} \leq 110$, since many of the effective code rates for $I_{TBS}=26$ can be higher than 0.930, three-layer TB sizes are separately designed for $0 \leq I_{TBS} \leq 25$ and $I_{TBS}=26$.

For $37 \leq N_{PRB} \leq 110$ and $0 \leq I_{TBS} \leq 25$, a TB_L1 to TB_L3 translation table is defined for each unique TB_L1 size in the 37-110 columns of the one-layer TBS table. A baseline TBS_L1 is taken from the ($I_{TBS}$, $N_{PRB}$) entry of the one-layer TBS table, then 3×TBS_L1 is compared with all entries of the one-layer and two-layer TBS table, and the most adjacent entry will be chosen as TBS_L3. When there are two entries that are equidistant from 3×TBS_L1, one value may be chosen from the two based on considerations such as the effective code rates, data rate and times of occurrence, and so on. Overall, there are 12 TBS_L1 values which have two equidistant entries in the one-layer and two-layer TBS table. These 12 TBS_L1 values are 2280, 2536, 2792, 2984, 3112, 3240, 3368, 3496, 3624, 3752, 3880 and 4008. Both equaldistant options are listed in Table 3 for these 10 TBS_L1 values. Either choice can be used as TBS_L3 in various embodiments. The larger one between these two entries, underscored in Table 3 (shown below), may be preferred due to the slightly higher data rate.

Furthermore, some 3×TBS_L1 are larger than all the entries in the one-layer and two-layer TBS table, there are 10 entries which do not have the adjacent entries in the one-layer and two-layer TBS table that can be used as TBS_L3. These TBS_L1 values are 51024, 52752, 55056, 57336, 59256, 61664, 63776, 66592, 68808, and 71112. For these entries, three-layer TB sizes are three times of TBS_L1 with some adjustment given for CRC bits and should be aligned with QPP sizes for turbo codes. The 10 entries of TBS_L1 and their corresponding TBS_L3 are shown boldfaced in Table 3. Also in Table 3, the two largest TBS_L1 values of 73712 and 75376 do not have a corresponding TBS_L3 value specified, because 73712 and 75376 are used only for $I_{TBS}=26$ for one-layer TB sizes.

Combining the smaller TBS_L3 that can be looked up in the one-layer and two-layer TBS table and the larger TBS_L3 that are constructed, the one-layer to 3-layer translation table is shown in Table 3.

TABLE 3

One-layer to three-layer TBS translation table with $37 \leq N_{PRB} \leq 110$ and $0 \leq I_{TBS} \leq 25$ in accordance with an embodiment of the invention.

| TBS_L1 | TBS_L3 |
|---|---|
| 1032 | 3112 |
| 1064 | 3240 |
| 1096 | 3240 |
| 1128 | 3368 |
| 1160 | 3496 |
| 1192 | 3624 |
| 1224 | 3624 |
| 1256 | 3752 |
| 1288 | 3880 |
| 1320 | 4008 |
| 1352 | 4008 |
| 1384 | 4136 |
| 1416 | 4264 |
| 1480 | 4392 |
| 1544 | 4584 |
| 1608 | 4776 |
| 1672 | 4968 |
| 1736 | 5160 |
| 1800 | 5352 |
| 1864 | 5544 |
| 1928 | 5736 |
| 1992 | 5992 |
| 2024 | 5992 |
| 2088 | 6200 |
| 2152 | 6456 |
| 2216 | 6712 |
| 2280 | 6712/<u>6968</u> |
| 2344 | 6968 |
| 2408 | 7224 |
| 2472 | 7480 |
| 2536 | 7480/<u>7736</u> |
| 2600 | 7736 |

TABLE 3-continued

One-layer to three-layer TBS translation table with $37 \leq N_{PRB} \leq 110$ and $0 \leq I_{TBS} \leq 25$ in accordance with an embodiment of the invention.

| TBS_L1 | TBS_L3 |
|---|---|
| 2664 | 7992 |
| 2728 | 8248 |
| 2792 | 8248/8504 |
| 2856 | 8504 |
| 2984 | 8760/9144 |
| 3112 | 9144/9528 |
| 3240 | 9528/9912 |
| 3368 | 9912/10296 |
| 3496 | 10296/10680 |
| 3624 | 10680/11064 |
| 3752 | 11064/11448 |
| 3880 | 11448/11832 |
| 4008 | 11832/12216 |
| 4136 | 12576 |
| 4264 | 12960 |
| 4392 | 12960 |
| 4584 | 13536 |
| 4776 | 14112 |
| 4968 | 14688 |
| 5160 | 15264 |
| 5352 | 15840 |
| 5544 | 16416 |
| 5736 | 16992 |
| 5992 | 18336 |
| 6200 | 18336 |
| 6456 | 19080 |
| 6712 | 19848 |
| 6968 | 20616 |
| 7224 | 21384 |
| 7480 | 22152 |
| 7736 | 22920 |
| 7992 | 23688 |
| 8248 | 24496 |
| 8504 | 25456 |
| 8760 | 26416 |
| 9144 | 27376 |
| 9528 | 28336 |
| 9912 | 29296 |
| 10296 | 30576 |
| 10680 | 31704 |
| 11064 | 32856 |
| 11448 | 34008 |
| 11832 | 35160 |
| 12216 | 36696 |
| 12576 | 37888 |
| 12960 | 39232 |
| 13536 | 40576 |
| 14112 | 42368 |
| 14688 | 43816 |
| 15264 | 45352 |
| 15840 | 46888 |
| 16416 | 48936 |
| 16992 | 51024 |
| 17568 | 52752 |
| 18336 | 55056 |
| 19080 | 57336 |
| 19848 | 59256 |
| 20616 | 61664 |
| 21384 | 63776 |
| 22152 | 66592 |
| 22920 | 68808 |
| 23688 | 71112 |
| 24496 | 73712 |
| 25456 | 76208 |
| 26416 | 78704 |
| 27376 | 81176 |
| 28336 | 84760 |
| 29296 | 87936 |
| 30576 | 90816 |
| 31704 | 93800 |
| 32856 | 97896 |
| 34008 | 101840 |
| 35160 | 105528 |
| 36696 | 110136 |

TABLE 3-continued

One-layer to three-layer TBS translation table with $37 \leq N_{PRB} \leq 110$ and $0 \leq I_{TBS} \leq 25$ in accordance with an embodiment of the invention.

| TBS_L1 | TBS_L3 |
|---|---|
| 37888 | 115040 |
| 39232 | 119816 |
| 40576 | 119816 |
| 42368 | 128496 |
| 43816 | 133208 |
| 45352 | 137792 |
| 46888 | 142248 |
| 48936 | 146856 |
| **51024** | **154104** |
| **52752** | **157432** |
| **55056** | **165216** |
| **57336** | **171888** |
| **59256** | **177816** |
| **61664** | **185728** |
| **63776** | **191720** |
| **66592** | **199824** |
| **68808** | **205880** |
| **71112** | **214176** |
| 73712 | N/A |
| 75376 | N/A |

For the situation where $N_{PRB}$={38, 40, 42, 44, 46, 48, 50, 52, 54, 56, 58, 60, 62, 64, 66, 68, 70, 72}, each ($I_{TBS}$,$N_{PRB}$) entry for the three-layer TBS table can also be given by the $$\left(I_{TBS}, \frac{3 \cdot N_{PRB}}{2}\right)$$

entry in the equivalent 27×110 two-layer TBS table which can be constructed by the one-layer to two-layer TB size translation table. The TBS subset thus obtained is different from the TBS obtained via the TB_L1 to TB_L3 translation table defined above in Table 3 in some embodiments. However, since these $N_{PRB}$ values are not consecutive, it may be more difficult to specify or implement than using a table like Table 3 for an entire set of consecutive $N_{PRB}$ values.

Again for $I_{TBS}$=26 and $37 \leq N_{PRB} \leq 110$, the three-layer TB sizes are redesigned based on system configurations so that the effective code rates should be smaller than 0.930. Equation (1) is used to calculate the effective code rates, assuming the associated reference configuration and with $N_{layer}$=3 and $Q_m$=6. The final TB sizes are given in Table 4. In Table 4, for each $N_{PRB}$, two candidate TBS values are provided; the larger value listed in the row labelled 26, and the smaller listed in the row labelled 26'. If only one candidate TBS value is provided for a $N_{PRB}$, then the value is used in both row 26 and row 26'. For each $N_{PRB}$, either TBS candidate (in row 26 or row 26') may be used. In various embodiments, it is advantageous to use the larger value in row 26, so that a slightly higher efficiency may be achieved. Alternatively, in some embodiments, the smaller value in the row 26' may be used, so that the TB can be received with relatively higher reliability. Alternatively, some embodiments may use values in row 26 for a subset of the $N_{PRB}$, and use values in row 26' for the rest.

In various embodiments, all the TBS values in Table 4 less than or equal to 149776 are chosen from the existing values for the one-layer and two-layer TB size table. Advantageously, this allows flexible scheduling for the (re)transmission of a TB size. For values greater than 149776 in Table 4, values in Table 3 are reused where appropriate.

TABLE 4

Three-layer transport block sizes with $37 \leq N_{PRB} \leq 110$ and $I_{TBS} = 26$ in accordance with an embodiment of the invention.

| | $N_{PRB}$ | | | |
|---|---|---|---|---|
| $I_{TBS}$ | 37 | 38 | 39 | 40 |
| 26 | 76208 | 78704 | 81176 | 81176 |
| 26' | 75376 | 76208 | 78704 | 78704 |

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 26 | 84760 | 84760 | 87936 | 90816 | 90816 | 93800 | 97896 | 97896 | 101840 | 101840 |
| 26' | 81176 | 81176 | 84760 | 87936 | 87936 | 90816 | 93800 | 93800 | 97896 | 97896 |

| | $N_{PRB}$ | | | | | | | | | |
|---|---|---|---|---|---|---|---|---|---|---|
| $I_{TBS}$ | 51 | 52 | 53 | 54 | 55 | 56 | 57 | 58 | 59 | 60 |
| 26 | 105528 | 105528 | 110136 | 110136 | 115040 | 115040 | 115040 | 119816 | 119816 | 119816 |
| 26' | 101840 | 101840 | 105528 | 105528 | 110136 | 110136 | 110136 | 115040 | 115040 | 115040 |

| | $N_{PRB}$ | | | | | | | | | |
|---|---|---|---|---|---|---|---|---|---|---|
| $I_{TBS}$ | 61 | 62 | 63 | 64 | 65 | 66 | 67 | 68 | 69 | 70 |
| 26 | 124464 | 124464 | 128496 | 128496 | 133208 | 133208 | 133208 | 142248 | 142248 | 146856 |
| 26' | 119816 | 119816 | 124464 | 124464 | 128496 | 128496 | 128496 | 137792 | 137792 | 142248 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 26 | 146856 | 146856 | 152976 | 152976 | 152976 | 152976 | 160032 | 160032 | 160032 | 167752 |
| 26' | 142248 | 142248 | 151376 | 151376 | 151376 | 151376 | 159096 | 159096 | 159096 | 165960 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 26 | 167752 | 167752 | 173744 | 173744 | 173744 | 179736 | 179736 | 179736 | 185728 | 185728 |
| 26' | 165960 | 165960 | 171888 | 171888 | 171888 | 177816 | 177816 | 177816 | 183744 | 183744 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 26 | 185728 | 191720 | 191720 | 191720 | 197712 | 197712 | 197712 | 203704 | 203704 | 209696 |
| 26' | 183744 | 189696 | 189696 | 189696 | 195816 | 195816 | 195816 | 201936 | 201936 | 208056 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 26 | 209696 | 209696 | 214176 | 214176 | 214176 | 214176 | 221680 | 221680 | 221680 | 221680 |
| 26' | 208056 | 208056 | 209696 | 209696 | 209696 | 209696 | 214176 | 214176 | 214176 | 214176 |

A four-layer table may be designed in accordance with an embodiment of the invention as described below. In various embodiments, a four-layer TB sizes are defined so that the code block sizes, with TB CRC bits and code block CRC bits attached, are aligned with QPP sizes for turbo codes. In various embodiments, four-layer TB sizes are two times two-layer TB sizes with some adjustment given for CRC bits. Most four-layer TB sizes occur in the one-layer TBS table, the two-layer TBS table, and the three-layer TBS table, thus providing the desired flexibility in (re)transmission schedule. Since the UE may skip decoding a TB in an initial transmission if the effective code rate is higher than 0.930, the effective code rates should be smaller than 0.930. This should be particularly considered for the highest spectral efficiency, i.e., $I_{TBS}=26$.

Similar to three-layer TB size design, it is found that the effective code rate of a TB mapped to four layers is higher than 0.930 if the $I_{TBS}=26$ sizes in the one-layer TBS table are scaled four times (or if the $I_{TBS}=26$ sizes in the equivalent two-layer TBS table are scaled twice). Therefore, in various embodiments, the four-layer TB size can be divided into two parts: $0 \leq I_{TBS} \leq 25$ and $I_{TBs}=26$, and again into two parts: $1 \leq N_{PRB} \leq 55$ and $56 \leq N_{PRB} \leq 110$.

In the first part, for $0 \leq I_{TBS} \leq 25$, the four-layer transport block sizes are twice the two-layer transport block sizes in principle with some adjustment given for CRC bits.

For $1 \leq N_{PRB} \leq 55$ and $0 \leq I_{TBS} \leq 25$, where 55=110/2, the four-layer TB sizes are given by the $(I_{TBS}, 2 \cdot N_{PRB})$ entry of the two-layer TBS table. This is because the effective code rates for every MCS levels are checked and are found to be less than 0.930.

For $56 \leq N_{PRB} \leq 110$ and $0 \leq I_{TBS} \leq 25$, a TB_L2 to TB_L4 translation table, as described below, is defined for each unique TB_L2 size in the 56-110 columns of the two-layer TBS table.

are chosen from the existing values for the one-layer, the equivalent two-layer, and the three-layer TBS tables. Advantageously, this allows flexible scheduling for the (re)transmission of a TB size.

TABLE 5

Four-layer TB sizes table with $1 \leq N_{PRB} \leq 55$ and $I_{TBS} = 26$ in accordance with an embodiment of the invention

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 26 | 2728 | 5544 | 8248 | 11064 | 13536 | 16416 | 19080 | 22152 | 24496 | 27376 |
| 26' | 2664 | 5352 | 7992 | 10680 | 12960 | 15840 | 18336 | 21384 | 23688 | 26416 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 26 | 30576 | 32856 | 35160 | 37888 | 40576 | 43816 | 46888 | 48936 | 52752 | 55056 |
| 26' | 29296 | 31704 | 34008 | 36696 | 39232 | 42368 | 45352 | 46888 | 51024 | 52752 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 26 | 57336 | 59256 | 63776 | 66592 | 68808 | 71112 | 75376 | 76208 | 81176 | 81176 |
| 26' | 55056 | 57336 | 61664 | 63776 | 66592 | 68808 | 73712 | 75376 | 78704 | 78704 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 26 | 84760 | 87936 | 90816 | 93800 | 97896 | 97896 | 101840 | 105528 | 105528 | 110136 |
| 26' | 81176 | 84760 | 87936 | 90816 | 93800 | 93800 | 97896 | 101840 | 101840 | 105528 |

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 26 | 110136 | 115040 | 119816 | 119816 | 124464 | 128496 | 128496 | 133208 | 133208 | 137792 |
| 26' | 105528 | 110136 | 115040 | 115040 | 119816 | 124464 | 124464 | 128496 | 128496 | 133208 |

| | $N_{PRB}$ | | | | |
|---|---|---|---|---|---|
| $I_{TBS}$ | 51 | 52 | 53 | 54 | 55 |
| 26 | 142248 | 142248 | 146856 | 149776 | 149776 |
| 26' | 137792 | 137792 | 142248 | 149776 | 149776 |

In the second part, for $I_{TBS}=26$, the four-layer TB sizes are determined so that the effective code rate is 0.930 or slightly lower.

For $1 \leq N_{PRB} \leq 55$ and $I_{TBS}=26$, many of the effective code rates are found to be higher than 0.930 if the $(I_{TBS}, 2 \cdot N_{PRB})$ entry of the two-layer TBS table is used. Thus the TB sizes are redesigned so that the effective code rates calculated based on Equation (1), with $N_{layer}=4$ and $Q_m=6$ (64-QAM), should be smaller than 0.930. The final TB sizes for $1 \leq N_{PRB} \leq 55$ and $I_{TBS}=26$ is shown in Table 5. In Table 5, for each $N_{PRB}$, two candidate TBS values are provided, the larger value is listed in the row labelled 26, and the smaller of the two is listed in the row labelled 26'. If only one candidate TBS value is provided for a $N_{PRB}$, then the value is used in both row 26 and row 26'. For each $N_{PRB}$, either TBS candidate (in row 26 or row 26') may be used. It is preferable to use the larger value in row 26, so that a slightly higher efficiency may be achieved. Alternatively, in some embodiments, the smaller value in the row 26' can be used, so that the TB can be received with relatively higher reliability. Some embodiments may use values in row 26 for a subset of the $N_{PRB}$, and use values in row 26' for the rest. In one or more embodiments, all the TBS values in Table 5

For $56 \leq N_{PRB} \leq 110$, since many of the effective code rates for $I_{TBS}=26$ can be higher than 0.930, four-layer transport block sizes are separately designed for $0 \leq I_{TBS} \leq 25$ and $I_{TBS}=26$.

For $0 \leq I_{TBS} \leq 25$, in order to ensure that TB sizes occur sufficient times, the relationships for one-layer TB sizes translated to two-layer TB sizes are reused as much as possible by two-layer TB sizes translated to four-layer transport block sizes. The translation relationship from one-layer TB sizes to two-layer TB sizes is given in Table 1 (shown previously).

Table 1 includes unique two-layer TB size for $56 \leq N_{PRB} \leq 110$ under columns labeled TBS_L2, where TBS_L1 denotes one-layer TB sizes and TBS_L2 denotes two-layer TB sizes. For the i-th TBS_L2 entry TBS_L2(i) in Table 1, TBS_L2(i) is used to look up the TBS_L1 entries in Table 1. When the TBS_L1(j) is located where TBS_L1(j)=TBS_L2(i), then TBS_L4(i)=TBS_L2(j). After the search, only twenty entries of TBS_L2(i) do not have the corresponding TBS_L1(j) in Table 1.

The twenty TBS_L2(i) values are the largest 20 TBS_L2 in Table 1. However only 18 TBS_L2 values need to have the translation relationship to TBS_L4, since the largest two TBS_L2 values {146856, 149776}, corresponding to TBS_L1 values {73712, 75376}, are only used for $I_{TBS}$=26. Thus the following 18 TBS_L2 values need to have the TBS_L4 value defined from scratch: 76208, 78704, 81176, 84760, 87936, 90816, 93800, 97896, 101840, 105528, 110136, 115040, 119816, 124464, 128496, 133208, 137792, and 142248. For these 18 TBS_L2 values, the TBS_L4 values are found which corresponds to 2×TBS_L2 with some adjustment given for CRC bits and should be aligned with QPP sizes for turbo codes. These 18 TBS_L2 values, together with their corresponding TBS_L1 and TBS_L4 values are boldfaced in Table 6.

In Table 6, the TBS_L2 to TBS_L4 translation relationship is shown. Table 6 repeats the TBS_L1 to TBS_L2 translation relationship shown in Table 1.

TABLE 6

Two-layer to four-layer TB sizes translation table with $55 \le N_{PRB} \le 110$ and $0 \le I_{TBS} \le 25$ in accordance with an embodiment of the invention

| TBS_L1 | TBS_L2 | TBS_L4 |
|---|---|---|
| 1544 | 3112 | 6200 |
| 1608 | 3240 | 6456 |
| 1672 | 3368 | 6712 |
| 1736 | 3496 | 6968 |
| 1800 | 3624 | 7224 |
| 1864 | 3752 | 7480 |
| 1928 | 3880 | 7736 |
| 1992 | 4008 | 7992 |
| 2024 | 4008 | 7992 |
| 2088 | 4136 | 8248 |
| 2152 | 4264 | 8504 |
| 2216 | 4392 | 8760 |
| 2280 | 4584 | 9144 |
| 2344 | 4776 | 9528 |
| 2408 | 4776 | 9528 |
| 2472 | 4968 | 9912 |
| 2536 | 5160 | 10296 |
| 2600 | 5160 | 10296 |
| 2664 | 5352 | 10680 |
| 2728 | 5544 | 11064 |
| 2792 | 5544 | 11064 |
| 2856 | 5736 | 11448 |
| 2984 | 5992 | 11832 |
| 3112 | 6200 | 12576 |
| 3240 | 6456 | 12960 |
| 3368 | 6712 | 13536 |
| 3496 | 6968 | 14112 |
| 3624 | 7224 | 14688 |
| 3752 | 7480 | 14688 |
| 3880 | 7736 | 15264 |
| 4008 | 7992 | 15840 |
| 4136 | 8248 | 16416 |
| 4264 | 8504 | 16992 |
| 4392 | 8760 | 17568 |
| 4584 | 9144 | 18336 |
| 4776 | 9528 | 19080 |
| 4968 | 9912 | 19848 |
| 5160 | 10296 | 20616 |
| 5352 | 10680 | 21384 |
| 5544 | 11064 | 22152 |
| 5736 | 11448 | 22920 |
| 5992 | 11832 | 23688 |
| 6200 | 12576 | 25456 |
| 6456 | 12960 | 25456 |
| 6712 | 13536 | 27376 |
| 6968 | 14112 | 28336 |
| 7224 | 14688 | 29296 |
| 7480 | 14688 | 29296 |
| 7736 | 15264 | 30576 |
| 7992 | 15840 | 31704 |
| 8248 | 16416 | 32856 |
| 8504 | 16992 | 34008 |
| 8760 | 17568 | 35160 |
| 9144 | 18336 | 36696 |
| 9528 | 19080 | 37888 |
| 9912 | 19848 | 39232 |
| 10296 | 20616 | 40576 |
| 10680 | 21384 | 42368 |
| 11064 | 22152 | 43816 |
| 11448 | 22920 | 45352 |
| 11832 | 23688 | 46888 |
| 12216 | 24496 | 48936 |
| 12576 | 25456 | 51024 |
| 12960 | 25456 | 51024 |
| 13536 | 27376 | 55056 |
| 14112 | 28336 | 57336 |
| 14688 | 29296 | 59256 |
| 15264 | 30576 | 61664 |
| 15840 | 31704 | 63776 |
| 16416 | 32856 | 66592 |
| 16992 | 34008 | 68808 |
| 17568 | 35160 | 71112 |
| 18336 | 36696 | 73712 |
| 19080 | 37888 | 76208 |
| 19848 | 39232 | 78704 |
| 20616 | 40576 | 81176 |
| 21384 | 42368 | 84760 |
| 22152 | 43816 | 87936 |
| 22920 | 45352 | 90816 |
| 23688 | 46888 | 93800 |
| 24496 | 48936 | 97896 |
| 25456 | 51024 | 101840 |
| 26416 | 52752 | 105528 |
| 27376 | 55056 | 110136 |
| 28336 | 57336 | 115040 |
| 29296 | 59256 | 119816 |
| 30576 | 61664 | 124464 |
| 31704 | 63776 | 128496 |
| 32856 | 66592 | 133208 |
| 34008 | 68808 | 137792 |
| 35160 | 71112 | 142248 |
| 36696 | 73712 | 146856 |
| **37888** | **76208** | **152976** |
| **39232** | **78704** | **157432** |
| **40576** | **81176** | **161760** |
| **42368** | **84760** | **169544** |
| **43816** | **87936** | **175600** |
| **45352** | **90816** | **181656** |
| **46888** | **93800** | **187712** |
| **48936** | **97896** | **195816** |
| **51024** | **101840** | **203704** |
| **52752** | **105528** | **211936** |
| **55056** | **110136** | **220296** |
| **57336** | **115040** | **230104** |
| **59256** | **119816** | **239656** |
| **61664** | **124464** | **248272** |
| **63776** | **128496** | **257016** |
| **66592** | **133208** | **266440** |
| **68808** | **137792** | **275608** |
| **71112** | **142248** | **284608** |
| 73712 | 146856 | N/A |
| 75376 | 149776 | N/A |

For $I_{TBS}$=26, the four-layer TB sizes are redesigned based on system configurations so that the effective code rates should be smaller than 0.930. Equation (1) is used to calculate the effective code rates, assuming the associated reference configuration and with $N_{layer}$=4 and $Q_m$=6. The final TB sizes are found and given in Table 7. In Table 7, for each $N_{PRB}$, two candidate TBS values are provided; the larger value listed in the row labelled 26, and the smaller listed in the row labelled 26'. If only one candidate TBS value is provided for a then the value is used in both row 26 and row 26'. For each $N_{PRB}$, either TBS candidate (in row 26 or row 26') may be used. It is preferable to use the larger value in row 26, so that a slightly higher efficiency may be achieved. Alternatively, the smaller value in the row 26' can be used, so that the TB can be received with relatively higher reliability. It is also possible to use values in row 26 for a subset of the $N_{PRB}$, and use values in row 26' for the rest.

TABLE 7

Four-layer TB sizes with $55 \leq N_{PRB} \leq 110$ and $I_{TBS} = 26$ in accordance with an embodiment of the invention.

| | $N_{PRB}$ | | | | |
|---|---|---|---|---|---|
| $I_{TBS}$ | 56 | 57 | 58 | 59 | 60 |
| 26 | 155768 | 159096 | 159096 | 165216 | 165216 |
| 26' | 154104 | 157432 | 157432 | 163488 | 163488 |

| | $N_{PRB}$ | | | | | | | | | |
|---|---|---|---|---|---|---|---|---|---|---|
| $I_{TBS}$ | 61 | 62 | 63 | 64 | 65 | 66 | 67 | 68 | 69 | 70 |
| 26 | 169544 | 169544 | 175600 | 175600 | 181656 | 181656 | 181656 | 189696 | 189696 | 195816 |
| 26' | 167752 | 167752 | 173744 | 173744 | 179736 | 179736 | 179736 | 187712 | 187712 | 193768 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 26 | 195816 | 195816 | 203704 | 203704 | 203704 | 203704 | 214176 | 214176 | 214176 | 224048 |
| 26' | 193768 | 193768 | 201936 | 201936 | 201936 | 201936 | 211936 | 211936 | 211936 | 221680 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 26 | 224048 | 224048 | 230104 | 230104 | 230104 | 239656 | 239656 | 239656 | 248272 | 248272 |
| 26' | 221680 | 221680 | 227672 | 227672 | 227672 | 238656 | 238656 | 238656 | 245648 | 245648 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 26 | 248272 | 257632 | 257632 | 257632 | 263624 | 263624 | 263624 | 272496 | 272496 | 278552 |
| 26' | 245648 | 257016 | 257016 | 257016 | 263136 | 263136 | 263136 | 269616 | 269616 | 275608 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 26 | 278552 | 278552 | 284608 | 284608 | 284608 | 284608 | 296720 | 296720 | 296720 | 296720 |
| 26' | 275608 | 275608 | 278552 | 278552 | 278552 | 278552 | 284608 | 284608 | 284608 | 284608 |

The four-layer TB sizes can be alternatively designed by setting the four-layer TB sizes to be four times the one-layer TB sizes. The above discussed design of four-layer TB sizes that are twice the two-layer TB sizes. Theoretically, this is equivalent to designing four-layer TB sizes that are four times the one-layer TB sizes. However, because the two-layer TB sizes are not exactly twice the one-layer TB sizes, a translation table based on four times the one-layer TB sizes may be different from Table 6 for some TBS_L1 values. On the other hand, the $I_{TBS}$=26 values in Table 6 and Table 7 does not change because they are determined based on the effective code rates.

For TBS_L1 values in the range of 1544≤TBS_L1≤36696, there are four TBS_L1 values that map to different TBS_L4 values with that in Table 6 if TBS_L4 is taken to be the closest value to 4×TBS_L1 in one-layer and two-layer TB sizes. The four TBS_L1 values are: 3752, 6200, 6712, and 29296. The relevant translation to TBS_L4 is shown in Table 8.

For TBS_L1 values greater than 36696, the TBS_L4 values are computed rather than looked up from existing one-layer and two-layer TBS table. If TBS_L4 is taken to be the closest value to 4×TBS_L1, TBS_L4 entries different from those in Table 6 may be found. For example, five TBS_L1 values, {37888, 59256, 61664, 63776, and 68808} have TBS_L4 translations different from Table 6, as shown in Table 8. Overall, Table 8contains the TBS_L4 translation entries different with those in Table 6. Translation for the rest of the sizes is the same as Table 6.

TABLE 8

Alternative one-layer to four-layer TB sizes translation table in accordance with an embodiment of the invention

| TBS_L1 | TBS_L2 | TBS_L4 |
|---|---|---|
| 3752 | 7480 | 15264 |
| 6200 | 12576 | 24496 |
| 6712 | 13536 | 26416 |
| 29296 | 59256 | 115040 |
| **37888** | **76208** | **151376** |
| **59256** | **119816** | **236160** |
| **61664** | **124464** | **245648** |
| **63776** | **128496** | **254328** |
| **68808** | **137792** | **275376** |

Figure 4:
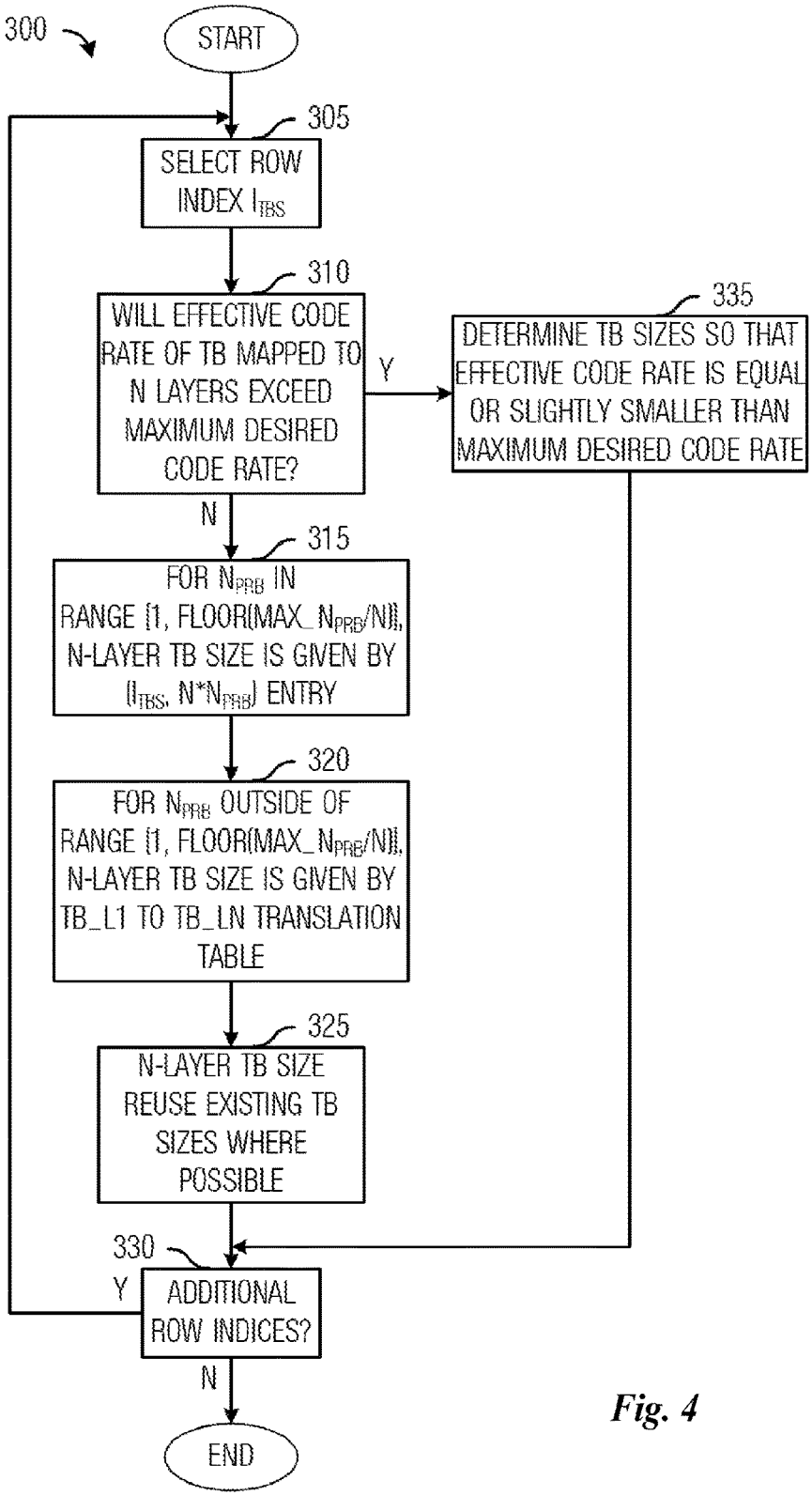
FIG. 4 is a flow diagram of operations in the design of TB sizes for a codeword-to-N-layer mapping, where N is greater than or equal to three in accordance with embodiments of the invention.

FIG. 4 illustrates a flow diagram of operations 300 in the design of TB sizes for a codeword-to-N-layer mapping, where N is greater than or equal to three (3). Operations 300 may be indicative of operations taking place in a processor or a computer used to map codewords to N-layers, producing a N-layer TBS table.

Operations 300 may begin with a processor selecting a row index ($I_{TBS}$) from a set of possible row indices, such as from a MCS table (block 305). The row index specifies a modulation and coding scheme to be used. The processor may have a list of row indices and may start at one end of the list and continue towards the other end of the list, for example. The processor may check to determine if the effective code rate of a TB mapped onto N-layers using the selected modulation and coding scheme will exceed a maximum desired code rate (block 310).

If the effective code rate does not exceed the maximum desired code rate, then for entries of the N-layer TBS table associated with the row index $I_{TRS}$ and column index $N_{PRB}$, where $N_{PRB}$ is an integer within a range of [1, floor (max_$N_{PRB}$/N)], the TB size may be given by the ($I_{TBS}$, N×$N_{PRB}$) entry of the one-layer TBS table (block 315). Here max_$N_{PRB}$ is the max number of physical resource blocks that can be allocated. For example, if the one-layer TBS table is of size 27×110, and N=3, then for entries of the three-layer TBS table within range [1 to 36], where max_$N_{PRB}$=110 and floor (max_$N_{PRB}$/N)=36, the entries are given by entry ($I_{TBS}$, 3·$N_{PRB}$) of the one-layer TBS table.

For entries where $N_{PRB}$ is an integer outside of the range of [1, floor(max_$N_{PRB}$/N)], the TB size may be defined using a translation table, such as Table 3 shown above (block 320). If possible, the entries in the translation table may be defined so that the N-layer TBS reuses existing TB sizes, such as values in the one-layer and two-layer TBS table (block 325). Furthermore, some N×TBS_L1 entries are larger than all the entries in the one-layer and two-layer TBS table. In one embodiment when N=3, there are 10 entries which do not have adjacent entries in the one-layer and two-layer TBS table that can be used as the N-layer TBS. For a three-layer table, these TBS_L1 values are 51024, 52752, 55056, 57336, 59256, 61664, 63776, 66592, 68808, and 71112. For these entries, three-layer TB sizes are three times of TBS_L1 with some adjustment given for CRC bits and should be aligned with QPP sizes for turbo codes. The 10 entries of one-layer TBS (TBS_L1) and their corresponding three-layer TBS (TBS_L3) are shown boldfaced in Table 3. If there are additional row indices to process (block 330), the processor may return block 305 to select another row index, else operations 300 may terminate.

If the effective code rate exceeds the maximum desired code rate (block 310), then entries of the N-layer TBS table that exceed the maximum desired code rate may be redesigned so that the effective code rate does not exceed the maximum desired code rate (block 335). If there are additional row indices to process (block 330), the processor may return block 305 to select another row index, else operations 300 may terminate.

Embodiments of the invention for uplink MIMO will next be described.

Uplink spatial multiplexing of up to four layers is considered for LTE-Advanced while only a single layer is allowed in LTE. As specified in 3GPP TS 36.814, in the uplink single user spatial multiplexing, up to two transport blocks can be transmitted from a scheduled UE in a subframe per uplink component carrier. Each transport block is likely to have its own MCS level. Depending on the number of transmission layers, the modulation symbols associated with each of the transport blocks are mapped onto one or two layers according to the same principle as in Rel-8 E-UTRA downlink spatial multiplexing.

Since in Rel-8 uplink transport block sizes are defined for one spatial layer only, there is a need to define the uplink transport block sizes which are mapped to two layers in Rel-10. While it is possible to reuse the Rel-10 two-layer TB sizes defined for DL, it is shown below that this is not conducive to the implementation of per-layer successive interference cancellation (SIC).

As described below, embodiments of the invention provide improved design for TB size allocation for improving uplink performance. In various embodiments, the new transport block sizes for uplink are designed for LTE-Advanced to facilitate successive interference cancellation in the receiver.

Code block segmentation and successive interference cancellation receiver will be first described because of their implications in designing a two-layer table. A transport block generated by MAC layer is passed to the physical layer for channel coding and other processing before transmission over the air. As described in 3GPP TS 36.212 V8.6.0 (2009-03), Multiplexing and channel coding, which is incorporated herein by reference, each TB is first attached with L=24 TB-level CRC bits. Then code block segmentation is performed on a TB to form code blocks (CBs). The turbo encoder individually encode each code blocks.

Let B be the TB size plus the TB-level CRC bits, i.e., B=TBS+L, where TBS refers to the transport block size. If B is smaller than Z, the entire TB including the TB-level CRC bits is treated as one code block (CB) and passed to turbo encoder. If B is larger than the maximum code block size Z, segmentation of the input bit sequence is performed and an additional CRC sequence of L=24 bits is attached to each code block. Here the maximum code block size is Z=6144 which is the largest QPP turbo interleaver length. As agreed for 3GPP LTE, the TB sizes are chosen such that no filler bits are necessary, and the code blocks are all of the same size.

Total number of code blocks C is determined by:

```
if B ≤ Z
    L = 0
    Number of code blocks: C = 1
     B' = B
else
    L = 24
    Number of code blocks: C = ⌈B /(Z − L)⌉.
     B' = B + C · L
end if
```

The code block sizes are B'/C.

When MIMO is used, modulation symbols of a TB is mapped to the spatial layers before transmitted by the multiple transmit antennas. At the receiver end, the received symbols of a TB are processed in the receiver to estimate the transmitted TB. To facilitate SIC, it is proposed in R1-091093, "Uplink SU-MIMO in LTE-Advanced," Ericsson, 3GPP TSG-RAN WGI #56, Athens, Greece, February 9-Feb. 13, 2009, which is incorporated herein by reference, that "One CRC per layer" should be used, taking advantage of the "functionality of one CRC per code block". This leads to a proposed codeword-to-layer mapping for uplink spatial multiplexing, as shown in Table 1. In Table 1, a codeword refers to the sequence of modulation symbols corresponding to a TB, $M_{symbol}^{layer}$ denotes the number of modulation symbols per layer transmitted in a LTE subframe, $d^{(i)}$ denotes the modulation symbols of the i-th TB, $x^{(i)}$ denotes the modulation symbol on the i-th antenna port.

TABLE 9

Codeword-to-layer mapping for UL spatial multiplexing in accordance with an embodiment of the invention

| Number of layers | Number of code words | Codeword-to-layer mapping $i = 0, 1, \ldots, M_{symb}^{layer} - 1$ | |
|---|---|---|---|
| 2 | 1 | $x^{(0)}(i) = d^{(0)}(i)$<br>$x^{(1)}(i) = d^{(0)}(M_{symb}^{layer} + i)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(i)$<br>$x^{(2)}(i) = d^{(1)}(M_{symb}^{layer} + i)$ | $M_{symb}^{layer} = M_{symb}^{(0)} = M_{symb}^{(1)}/2$ |
| 4 | 2 | $x^{(0)}(i) = d^{(0)}(i)$<br>$x^{(1)}(i) = d^{(0)}(M_{symb}^{layer} + i)$<br>$x^{(2)}(i) = d^{(1)}(i)$<br>$x^{(3)}(i) = d^{(1)}(M_{symb}^{layer} + i)$ | $M_{symb}^{layer} = M_{symb}^{(0)}/2 = M_{symb}^{(1)}/2$ |

This mapping allows per-layer SIC, considering that a transport block goes through the code block segmentation process, as defined in 3GPP TS 36.212. As defined in 3GPP TS 36.212, a TB is appended with 24 TB-level CRC bits and passed to the code block segmentation process. For a TB (including CRC bits) greater than 6144 bits, the TB is segmented into code blocks. Each code block is appended with CB-level CRC bits. Each code block (including CB-level CRC bits) is then turbo encoded individually. With the mapping in Table 1, the CB-level CRC can be utilized to form a per-layer CRC check, thus allowing per-layer SIC.

Without channel interleaving to mix bits of code blocks, the codeword to layer mapping in Table 9 would keep bits of a given code block together, except possibly at the end of the first layer and the beginning of the second layer. For a TB composed of an even number of code blocks, the method maps an integer number of code blocks to a layer, thus no CB will be divided between two layers.

Figure 5A:
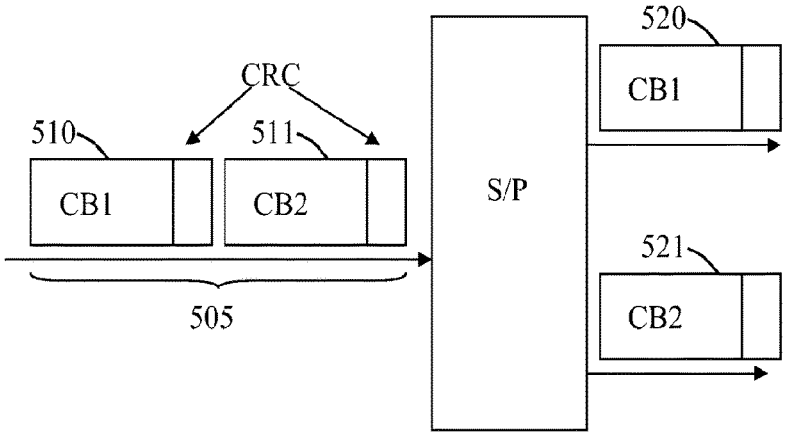
Figure 5B:
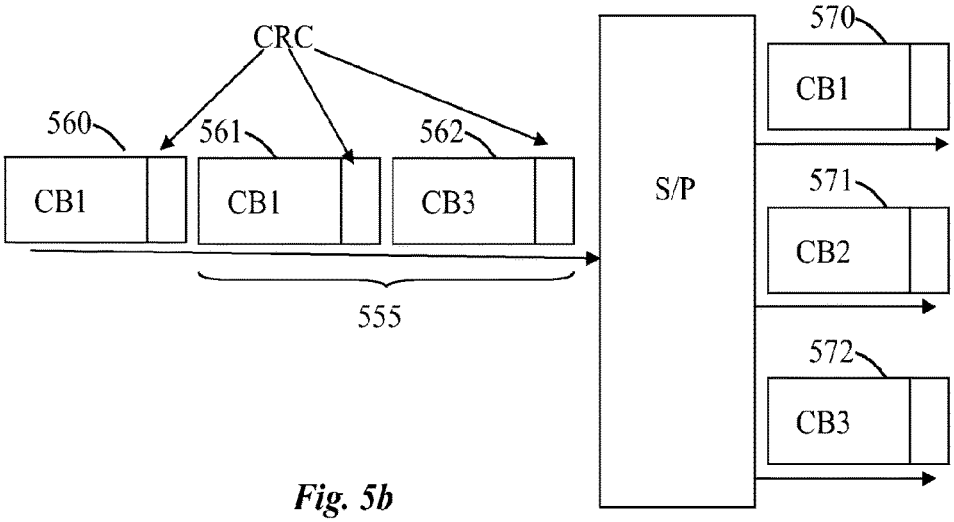

FIG. 5, which includes FIGS. 5a and 5b, illustrates mapping a transport block to multiple uplink layers, wherein FIG. 5a illustrates mapping of a transport block having two code blocks to two layers, and wherein FIG. 5b illustrates mapping of a transport block having three code blocks to three layers, in accordance with embodiments of the invention.

FIG. 5a illustrates a mapping of a TB 505 with two code blocks to two layers. As shown in FIG. 5a, TB 505 includes two code blocks (CB1 510 and CB2 511). Each of the two code blocks also includes a CB-level CRC. The mapping results in one code block in each of the two uplink layers (shown as CB1 520 and CB2 521). Additionally, each uplink layer has one CRC due to a per-code block CRC defined in the LTE Rel-8.

Although shown in FIG. 5a (and in other figures discussed herein) as being a single contiguous code block on a single layer when an entire code block is mapped onto the single layer for simplicity reasons (for example, CB1 520), in an actual communications system, the code block may be spread over a layer. For example, modulation symbols of the code block may not be in a proper order (such as due to interleaving or some other information dispersal technique), modulation symbols may not be contiguous (such as due to insertion of control information, error correction/detection information, bit puncturing, and so forth). Therefore, the illustration of a single contiguous code block should not be construed as being limiting to either the spirit or the scope of the embodiments.

In general, if a TB comprises an even number of code blocks (denoted 2C), each uplink layer may be assigned C code blocks and each code block would have a CRC. Therefore, each uplink layer has an equivalent CRC and an uplink layer may be deemed correct if all C code block-level CRC checks correctly, while an uplink layer may be deemed incorrect if one or more of the C code block-level CRC checks incorrectly. SIC may then be facilitated as an entire set of bits of a first layer (e.g., layer one) and can be used for interference cancellation of bits of a second layer (e.g., layer two) when the first layer's CRC checks correctly, and vice versa.

For C=1, i.e., the TB size is smaller than or equal to 6120 bits, and not segmented into code blocks. In this case, only TB-level CRC bits are attached to the TB, without any CB-level CRC bits. In this case, the receiver may use MMSE or ML algorithm.

While the discussion focuses on the case where channel interleaving is not used, the same discussion holds if per-layer channel interleaving is used. With channel interleaving where bits of different layer are interleaved separately, and an even number of CBs, bits of a given code block will be kept in the same layer with the codeword to layer mapping in Table 9.

The basic SIC receiver can be enhanced to exploit the fact that each code block in LTE has CB-level CRC. One possible way of performing SIC is discussed below for the case of one TB being mapped to two layers. Due to the presence of CB-level CRC, a fraction or the whole of a layer is protected by CRC bits, if a TB is composed of two or more code blocks. Rather than requiring the correctness of the entire layer being confirmed before interference cancellation as required by the basic SIC, a partial interference cancellation can be carried out as long as correctness of any part of the layer is confirmed.

One way to perform the enhanced SIC receiver is described here. First a 2×2 MMSE is first performed at the receiver. The layer with higher SINR is identified and decoded.

(a) After turbo decoding, CBs that are fully contained in the stronger layer are CRC checked. The CBs that are deemed correctly received can be used to reconstruct interference. The interference can then be cancelled from the buffered receive samples. The data of second layer can then be estimated and decoded. Note that this is different from the basic SIC processing that part of the bits, vs. all the bits, of the layer can be used for cancellation. For example, if the stronger layer carries 2.5 CBs, and only one CB is correctly received, the correct CB can be used for cancellation.

(b) After the processing of the stronger layer, likely with a certain degree of interference cancelled for the weaker layer, then the weaker layer is turbo decoded and CRC checked. If the weaker layer (or part of it) passes the CRC check, then the weaker layer can be used to cancel interference for the stronger layer, if the corresponding part of the stronger layer was not detected correctly.

(c) Iterate (a) and (b) until both layers are correctly decoded, or no improvement is observed, or a predefined number of iterations are reached. If both layers fail the CRC checks after a predefined number of iterations, then both TBs are declared to be in error.

In the above, the description included the case where a TB is segmented into an odd number of CBs and a CB may be mapped to layers. However, if a TB is segmented into an even number of CBs, the SIC receiver can be simplified because no layer contains a partial CB.

While the procedure above only discusses SIC between layers corresponding to a TB, the same principle can be applied between TBs if two TBs are used as in the case of 3 and 4 layers in Table 9. Since each TB has TB-level CRC, the SIC receiver can utilize both the CB-level CRC and the TB-level CRC.

FIG. 5b illustrates a mapping of a TB 555 with three code blocks to three layers. As shown in FIG. 5b, TB 555 includes three code blocks (CB1 560, CB2 561, and CB3 562). Each of the three code blocks include a CB-level CRC. The mapping results in one code block in each of the three uplink layers (shown as CB1 570, CB2 571, and CB3 573). The use of code blocks that are multiples of three in the TB 555 ensures enhanced SIC as described above for the two-layer case. Similar to the two layer case, for C=1, i.e., the TB size is smaller than or equal to 6120 bits, and not segmented into code blocks.

The design of uplink two-layer transport block sizes will now be described in accordance with an embodiment of the invention.

Uplink transport block sizes are defined and signaled similar to downlink. For uplink, to signal the transmit format, including the TB size of a TB, the DCI (downlink control information) is used which contains a 5-bit MCS field. The MCS field points to the 32 rows in the MCS Table, "Modulation, TBS index and redundancy version table for PUSCH," in 3GPP TS 36.213. In the MCS table, three MCS states are reserved for signaling redundancy version for retransmission, and two overlapped MCSs for transitioning from QPSK to 16-QAM, and from 16-QAM to 64-QAM, respectively. Thus there are 27 distinct spectral efficiency levels (i.e., MCS levels), corresponding to the 27 rows of the Table of one-layer transport block sizes. With the MCS field and the RB allocation, the TB size is obtained by looking up the 27×110 one-layer transport block size table. As currently defined in 3GPP TS 36.213, the uplink one-layer TB size table is the same as the downlink one-layer TB size table. Although nominally, the uplink TBS table reuses the DL TBS table and thus contains TBS for $N_{PRB}$ from 1 to 110, only a subset of the $N_{PRB}$ values are actually used for uplink, as shown below.

While the uplink TB size table appears to be of the same dimension as the downlink TB size table, in reality on the uplink only certain $N_{PRB}$ values are valid. As specified in 3GPP TS 36.211 V8.5.0 (2008-12), Physical Channels and Modulation, which is incorporated herein by reference, the variable $M_{sc}^{PUSCH}=M_{RB}^{PUSCH}\cdot N_{sc}^{RB}$, where $M_{RB}^{PUSCH}$ represents the bandwidth of the PUSCH in terms of resource blocks, and shall fulfill $$M_{RB}^{PUSCH}=2^{\alpha_2}\cdot 3^{\alpha_3}\cdot 5^{\alpha_5}\leq N_{RB}^{UL}$$

where $\alpha_2,\alpha_3,\alpha_5$ is a set of non-negative integers.

Since for 3GPP LTE, the maximum $N_{RB}^{UL}$ defined is 110, the valid $M_{RB}^{PUSCH}$ values are:

$$\{1\ 2\ 3\ 4\ 5\ 6\ 8\ 9\ 10\ 12\ 15\ 16\ 18\ 20\ 24\ 25\ 27\ 30\ 32\ 36\ 40\ 45\ 48\ 50\ 54\ 60\ 64\ 72\ 75\ 80\ 81\ 90\ 96\ 100\ 108\} \quad (2)$$

$M_{RB}^{PUSCH}$ in 3GPP TS 36.211 is equivalent to $N_{PRB}$ which is the column index of the TB size table. Thus for the uplink TB size table design, only $N_{PRB}$ of the above values need to be considered.

Similar to downlink, the method for obtaining uplink two-layer transport block sizes based on one-layer transport block sizes can be given below.

(a) For $1\leq N_{PRB}\leq 55$, the two-layer transport block sizes are given by the $(I_{TBS},2\cdot N_{PRB})$ entry of Table for one-layer transport block sizes.

(b) For $56\leq N_{PRB}\leq 110$, a baseline TBS_L1 is taken from the $(I_{TBS},N_{PRB})$ entry of Table for one-layer transport block sizes, which is then translated into TBS_L2 using a mapping rule (e.g., using Table 1). The two-layer transport block sizes are given by TBS_L2.

However, unlike downlink transmission, for both (a) and (b), if the transport block size is greater than 6120, the two-layer TBS need to contain an even number of code blocks when segmented, to facilitate SIC. Thus the TBS_L2 values obtained from the TBS tables defined for downlink may need to be replaced by another value TBS_L2'. Below the two-layer TBS design for $5\leq N_{PRB}\leq 110$ is shown in details, as an example of designing the entire uplink two-layer TBS. In other words, a one-layer to two-layer TBS translation table is designed below for the TBS in the following $N_{PRB}$ columns in the one-layer TBS table:

$$N_{PRB}=\{60, 64, 72, 75, 80, 81, 90, 96, 100, 108\} \quad (3)$$

For $N_{PRB}$ values in (3), a baseline TBS_L1 is taken from the $(I_{TBS},N_{PRB})$ entry of Table for one-layer transport block sizes, which is then translated into TBS_L2 using the one-layer to two-layer TBS translation table.

If the TBS_L1 to TBS_L2 translation relationship in Table 1 is reused, the translation table for uplink MIMO would be as shown in Table 10, where $N_{cb}$_L2 column shows the number of code blocks segmented from TBS_L2. Note that certain TBS_L1 values in Table 1 are not included in Table 10, due to the fact that only $N_{PRB}$ values in (3) need to be considered for uplink.

For TBS_L2 values with odd $N_{cb}$_L2 values and $N_{cb}$_L2>2 in Table 10, the TBS_L2 need to be redesigned to facilitate per-layer SIC receiver. The results of the redesign is shown in Table 11, where TBS_L2' shows the proposed two-layer TB size, and $N_{cb}$_L2' shows the number of code blocks segmented from TBS_L2'. For each TBS_L1 entry, the corresponding TBS_L2' value is found by using the TBS of an even number of CBs that is closest to (2×TBS_L1).

In an embodiment of the invention, the TBS_L2' values for uplink are found using the following steps:

i) Find TBS_L2 as defined for downlink in 3GPP TS 36.213;

ii) Use code block segmentation procedure to find C, the number of CBs for TBS_L2.

a) If C is even, TBS_L2 defined for downlink is used for uplink also, i.e., TBS_L2'=TBS_L2.

b) If C is odd, TBS_L2' value is found by using the TBS of an even number of CBs that is closest to (2×TBS_L1).

TABLE 10

One-layer to two-layer transport block sizes translation table using relationship in Table 1 in accordance with an embodiment of the invention.

| TBS_L1 | TBS_L2 | $N_{cb}$_L2 |
|---|---|---|
| 1672 | 3368 | 1 |
| 1800 | 3624 | 1 |
| 1992 | 4008 | 1 |
| 2088 | 4136 | 1 |
| 2152 | 4264 | 1 |
| 2216 | 4392 | 1 |
| 2280 | 4584 | 1 |
| 2344 | 4776 | 1 |
| 2536 | 5160 | 1 |
| 2600 | 5160 | 1 |
| 2664 | 5352 | 1 |
| 2728 | 5544 | 1 |
| 2792 | 5544 | 1 |
| 2856 | 5736 | 1 |
| 2984 | 5992 | 1 |
| 3240 | 6456 | 2 |
| 3368 | 6712 | 2 |
| 3496 | 6968 | 2 |
| 3624 | 7224 | 2 |
| 3752 | 7480 | 2 |
| 4008 | 7992 | 2 |
| 4264 | 8504 | 2 |
| 4392 | 8760 | 2 |
| 4584 | 9144 | 2 |
| 4776 | 9528 | 2 |
| 5160 | 10296 | 2 |
| 5352 | 10680 | 2 |
| 5544 | 11064 | 2 |
| 5736 | 11448 | 2 |
| 6200 | 12576 | 3 |
| 6456 | 12960 | 3 |
| 6712 | 13536 | 3 |
| 6968 | 14112 | 3 |
| 7224 | 14688 | 3 |
| 7480 | 14688 | 3 |
| 7736 | 15264 | 3 |
| 7992 | 15840 | 3 |
| 8248 | 16416 | 3 |
| 8504 | 16992 | 3 |
| 8760 | 17568 | 3 |
| 9144 | 18336 | 3 |
| 9528 | 19080 | 4 |
| 9912 | 19848 | 4 |
| 10296 | 20616 | 4 |
| 10680 | 21384 | 4 |
| 11064 | 22152 | 4 |
| 11448 | 22920 | 4 |
| 11832 | 23688 | 4 |
| 12216 | 24496 | 5 |
| 12576 | 25456 | 5 |
| 12960 | 25456 | 5 |
| 13536 | 27376 | 5 |
| 14112 | 28336 | 5 |
| 14688 | 29296 | 5 |
| 15264 | 30576 | 5 |
| 15840 | 31704 | 6 |
| 16416 | 32856 | 6 |
| 16992 | 34008 | 6 |
| 17568 | 35160 | 6 |
| 18336 | 36696 | 6 |
| 19080 | 37888 | 7 |
| 19848 | 39232 | 7 |
| 20616 | 40576 | 7 |
| 21384 | 42368 | 7 |
| 22152 | 43816 | 8 |
| 22920 | 45352 | 8 |
| 23688 | 46888 | 8 |
| 24496 | 48936 | 8 |
| 25456 | 51024 | 9 |
| 26416 | 52752 | 9 |
| 27376 | 55056 | 9 |
| 28336 | 57336 | 10 |
| 29296 | 59256 | 10 |
| 30576 | 61664 | 11 |

TABLE 10-continued

One-layer to two-layer transport block sizes translation table using relationship in Table 1 in accordance with an embodiment of the invention.

| TBS_L1 | TBS_L2 | $N_{cb}$_L2 |
|---|---|---|
| 31704 | 63776 | 11 |
| 32856 | 66592 | 11 |
| 34008 | 68808 | 12 |
| 35160 | 71112 | 12 |
| 36696 | 73712 | 13 |
| 37888 | 76208 | 13 |
| 39232 | 78704 | 13 |
| 40576 | 81176 | 14 |
| 42368 | 84760 | 14 |
| 43816 | 87936 | 15 |
| 45352 | 90816 | 15 |
| 46888 | 93800 | 16 |
| 48936 | 97896 | 16 |
| 51024 | 101840 | 17 |
| 52752 | 105528 | 18 |
| 55056 | 110136 | 18 |
| 57336 | 115040 | 19 |
| 59256 | 119816 | 20 |
| 61664 | 124464 | 21 |
| 63776 | 128496 | 21 |
| 66592 | 133208 | 22 |
| 68808 | 137792 | 23 |
| 71112 | 142248 | 24 |
| 75376 | 149776 | 25 |

TABLE 11

One-layer to two-layer transport block sizes translation table: Redesigned Subset of Table 10 in accordance with an embodiment of the invention.

| TBS_L1 | TBS_L2 | Ncb_L2 | TBS_L2' | Ncb_L2' |
|---|---|---|---|---|
| 6200 | 12576 | 3 | 12216 | 2 |
| 6456 | 12960 | 3 | 12216 | 2 |
| 6712 | 13536 | 3 | 12216 | 2 |
| 6968 | 14112 | 3 | 12216 | 2 |
| 7224 | 14688 | 3 | 12216 | 2 |
| 7480 | 14688 | 3 | 12216 | 2 |
| 7736 | 15264 | 3 | 18568 | 4 |
| 7992 | 15840 | 3 | 18568 | 4 |
| 8248 | 16416 | 3 | 18568 | 4 |
| 8504 | 16992 | 3 | 18568 | 4 |
| 8760 | 17568 | 3 | 18568 | 4 |
| 9144 | 18336 | 3 | 18568 | 4 |
| 12216 | 24496 | 5 | 24456 | 4 |
| 12576 | 25456 | 5 | 24456 | 4 |
| 12960 | 25456 | 5 | 24456 | 4 |
| 13536 | 27376 | 5 | 24456 | 4 |
| 14112 | 28336 | 5 | 30936 | 6 |
| 14688 | 29296 | 5 | 30936 | 6 |
| 15264 | 30576 | 5 | 30936 | 6 |
| 19080 | 37888 | 7 | 36696 | 6 |
| 19848 | 39232 | 7 | 36696 | 6 |
| 20616 | 40576 | 7 | 43304 | 8 |
| 21384 | 42368 | 7 | 43304 | 8 |
| 25456 | 51024 | 9 | 48936 | 8 |
| 26416 | 52752 | 9 | 55416 | 10 |
| 27376 | 55056 | 9 | 55416 | 10 |
| 30576 | 61664 | 11 | 61176 | 10 |
| 31704 | 63776 | 11 | 61176 | 10 |
| 32856 | 66592 | 11 | 68040 | 12 |
| 36696 | 73712 | 13 | 73416 | 12 |
| 37888 | 76208 | 13 | 73416 | 12 |
| 39232 | 78704 | 13 | 80280 | 14 |
| 43816 | 87936 | 15 | 85656 | 14 |
| 45352 | 90816 | 15 | 92776 | 16 |
| 51024 | 101840 | 17 | 104376 | 18 |

TABLE 11-continued

One-layer to two-layer transport block sizes translation table: Redesigned Subset of Table 10 in accordance with an embodiment of the invention.

| TBS_L1 | TBS_L2 | Ncb_L2 | TBS_L2' | Ncb_L2' |
|---|---|---|---|---|
| 57336 | 115040 | 19 | 117256 | 20 |
| 61664 | 124464 | 21 | 122376 | 20 |
| 63776 | 128496 | 21 | 128984 | 22 |

TABLE 11-continued

One-layer to two-layer transport block sizes translation table: Redesigned Subset of Table 10 in accordance with an embodiment of the invention.

| TBS_L1 | TBS_L2 | Ncb_L2 | TBS_L2' | Ncb_L2' |
|---|---|---|---|---|
| 68808 | 137792 | 23 | 134616 | 22 |
| 75376 | 149776 | 25 | 154104 | 26 |

Similar to $N_{PRB}$ values in (3), the two-layer TBS corresponding to values $N_{PRB}$ smaller than 56 are also found using the steps in i) and ii). Overall, the entire two-layer TB size table is shown below in Table 12 for all the $N_{PRB}$ values in (2).

TABLE 12

Uplink two-layer transport block size table of size 27 × 35 in accordance with an embodiment of the invention.

| | $N_{PRB}$ | | | | | | | | | |
|---|---|---|---|---|---|---|---|---|---|---|
| $I_{TBS}$ | 1 | 2 | 3 | 4 | 5 | 6 | 8 | 9 | 10 | 12 |
| 0 | 32 | 88 | 152 | 208 | 256 | 328 | 424 | 488 | 536 | 648 |
| 1 | 56 | 144 | 208 | 256 | 344 | 424 | 568 | 632 | 712 | 872 |
| 2 | 72 | 176 | 256 | 328 | 424 | 520 | 696 | 776 | 872 | 1064 |
| 3 | 104 | 208 | 328 | 440 | 568 | 680 | 904 | 1032 | 1160 | 1384 |
| 4 | 120 | 256 | 408 | 552 | 696 | 840 | 1128 | 1288 | 1416 | 1736 |
| 5 | 144 | 328 | 504 | 680 | 872 | 1032 | 1384 | 1544 | 1736 | 2088 |
| 6 | 176 | 392 | 600 | 808 | 1032 | 1224 | 1672 | 1864 | 2088 | 2472 |
| 7 | 224 | 472 | 712 | 968 | 1224 | 1480 | 1928 | 2216 | 2472 | 2984 |
| 8 | 256 | 536 | 808 | 1096 | 1384 | 1672 | 2216 | 2536 | 2792 | 3368 |
| 9 | 296 | 616 | 936 | 1256 | 1544 | 1864 | 2536 | 2856 | 3112 | 3752 |
| 10 | 328 | 680 | 1032 | 1384 | 1736 | 2088 | 2792 | 3112 | 3496 | 4264 |
| 11 | 376 | 776 | 1192 | 1608 | 2024 | 2408 | 3240 | 3624 | 4008 | 4776 |
| 12 | 440 | 904 | 1352 | 1800 | 2280 | 2728 | 3624 | 4136 | 4584 | 5544 |
| 13 | 488 | 1000 | 1544 | 2024 | 2536 | 3112 | 4136 | 4584 | 5160 | 6200 |
| 14 | 552 | 1128 | 1736 | 2280 | 2856 | 3496 | 4584 | 5160 | 5736 | 6968 |
| 15 | 600 | 1224 | 1800 | 2472 | 3112 | 3624 | 4968 | 5544 | 6200 | 7224 |
| 16 | 632 | 1288 | 1928 | 2600 | 3240 | 3880 | 5160 | 5992 | 6456 | 7736 |
| 17 | 696 | 1416 | 2152 | 2856 | 3624 | 4392 | 5736 | 6456 | 7224 | 8760 |
| 18 | 776 | 1544 | 2344 | 3112 | 4008 | 4776 | 6200 | 7224 | 7992 | 9528 |
| 19 | 840 | 1736 | 2600 | 3496 | 4264 | 5160 | 6968 | 7736 | 8504 | 10296 |
| 20 | 904 | 1864 | 2792 | 3752 | 4584 | 5544 | 7480 | 8248 | 9144 | 11064 |
| 21 | 1000 | 1992 | 2984 | 4008 | 4968 | 5992 | 7992 | 9144 | 9912 | 12216 |
| 22 | 1064 | 2152 | 3240 | 4264 | 5352 | 6456 | 8504 | 9528 | 10680 | 12216 |
| 23 | 1128 | 2280 | 3496 | 4584 | 5736 | 6968 | 9144 | 10296 | 11448 | 12216 |
| 24 | 1192 | 2408 | 3624 | 4968 | 5992 | 7224 | 9912 | 11064 | 12216 | 12216 |
| 25 | 1256 | 2536 | 3752 | 5160 | 6200 | 7480 | 10296 | 11448 | 12216 | 12216 |
| 26 | 1480 | 2984 | 4392 | 5992 | 7480 | 8760 | 11832 | 12216 | 12216 | 18568 |

| | $N_{PRB}$ | | | | | | | | | |
|---|---|---|---|---|---|---|---|---|---|---|
| $I_{TBS}$ | 15 | 16 | 18 | 20 | 24 | 25 | 27 | 30 | 32 | 36 |
| 0 | 808 | 872 | 1000 | 1096 | 1320 | 1384 | 1480 | 1672 | 1800 | 1992 |
| 1 | 1064 | 1160 | 1288 | 1416 | 1736 | 1800 | 1992 | 2152 | 2344 | 2600 |
| 2 | 1320 | 1416 | 1608 | 1800 | 2152 | 2216 | 2408 | 2664 | 2856 | 3240 |
| 3 | 1736 | 1864 | 2088 | 2344 | 2792 | 2856 | 3112 | 3496 | 3752 | 4264 |
| 4 | 2152 | 2280 | 2600 | 2856 | 3496 | 3624 | 3880 | 4264 | 4584 | 5160 |
| 5 | 2664 | 2792 | 3112 | 3496 | 4264 | 4392 | 4776 | 5352 | 5736 | 6200 |
| 6 | 3112 | 3368 | 3752 | 4136 | 4968 | 5160 | 5736 | 6200 | 6712 | 7480 |
| 7 | 3624 | 3880 | 4392 | 4968 | 5992 | 6200 | 6712 | 7224 | 7736 | 8760 |
| 8 | 4264 | 4584 | 4968 | 5544 | 6712 | 6968 | 7480 | 8504 | 9144 | 9912 |
| 9 | 4776 | 5160 | 5736 | 6200 | 7480 | 7992 | 8504 | 9528 | 10296 | 11448 |
| 10 | 5352 | 5736 | 6200 | 6968 | 8504 | 8760 | 9528 | 10680 | 11448 | 12216 |
| 11 | 5992 | 6456 | 7224 | 7992 | 9528 | 9912 | 11064 | 12216 | 12216 | 12216 |
| 12 | 6712 | 7224 | 8248 | 9144 | 11064 | 11448 | 12216 | 12216 | 12216 | 18568 |
| 13 | 7736 | 8248 | 9144 | 10296 | 12216 | 12216 | 12216 | 18568 | 18568 | 18568 |
| 14 | 8504 | 9144 | 10296 | 11448 | 12216 | 12216 | 18568 | 18568 | 18568 | 20616 |
| 15 | 9144 | 9912 | 11064 | 12216 | 12216 | 18568 | 18568 | 18568 | 19848 | 22152 |
| 16 | 9912 | 10296 | 11832 | 12216 | 18568 | 18568 | 18568 | 19848 | 20616 | 23688 |
| 17 | 10680 | 11448 | 12216 | 12216 | 18568 | 18568 | 19848 | 21384 | 22920 | 24456 |
| 18 | 11832 | 12216 | 12216 | 18568 | 19080 | 19848 | 21384 | 23688 | 24456 | 30936 |
| 19 | 12216 | 12216 | 18568 | 18568 | 20616 | 21384 | 22920 | 24456 | 24456 | 30936 |
| 20 | 12216 | 12216 | 18568 | 18568 | 22152 | 22920 | 24456 | 30936 | 30936 | 34008 |
| 21 | 12216 | 18568 | 18568 | 19848 | 24456 | 24456 | 24456 | 30936 | 31704 | 36696 |

TABLE 12-continued

Uplink two-layer transport block size table of size 27 × 35 in accordance with an embodiment of the invention.

| | | | | | | | | | | |
|---|---|---|---|---|---|---|---|---|---|---|
| 22 | 18568 | 18568 | 19080 | 21384 | 24456 | 24456 | 30936 | 32856 | 34008 | 36696 |
| 23 | 18568 | 18568 | 20616 | 22920 | 24456 | 30936 | 30936 | 34008 | 36696 | 43304 |
| 24 | 18568 | 19848 | 22152 | 24456 | 30936 | 30936 | 32856 | 36696 | 36696 | 43816 |
| 25 | 19080 | 20616 | 22920 | 24456 | 30936 | 31704 | 34008 | 36696 | 43304 | 45352 |
| 26 | 22152 | 23688 | 24456 | 30936 | 35160 | 36696 | 36696 | 43816 | 46888 | 55416 |

| | $N_{PRB}$ | | | | | | | | | |
|---|---|---|---|---|---|---|---|---|---|---|
| $I_{TBS}$ | 40 | 45 | 48 | 50 | 54 | 60 | 64 | 72 | 75 | 80 |
| 0 | 2216 | 2536 | 2664 | 2792 | 2984 | 3368 | 3624 | 4008 | 4136 | 4392 |
| 1 | 2856 | 3240 | 3496 | 3624 | 4008 | 4264 | 4776 | 5160 | 5544 | 5736 |
| 2 | 3624 | 4008 | 4264 | 4584 | 4776 | 5352 | 5736 | 6456 | 6712 | 7224 |
| 3 | 4776 | 5352 | 5544 | 5736 | 6200 | 6968 | 7480 | 8504 | 8760 | 9528 |
| 4 | 5736 | 6456 | 6968 | 7224 | 7736 | 8504 | 9144 | 10296 | 10680 | 11448 |
| 5 | 6968 | 7992 | 8504 | 8760 | 9528 | 10680 | 11448 | 12216 | 12216 | 12216 |
| 6 | 8248 | 9528 | 9912 | 10296 | 11448 | 12216 | 12216 | 12216 | 18568 | 18568 |
| 7 | 9912 | 11064 | 11832 | 12216 | 12216 | 12216 | 18568 | 18568 | 18568 | 19848 |
| 8 | 11064 | 12216 | 12216 | 12216 | 12216 | 18568 | 18568 | 19848 | 21384 | 22152 |
| 9 | 12216 | 12216 | 12216 | 18568 | 18568 | 19080 | 20616 | 22920 | 23688 | 24456 |
| 10 | 12216 | 18568 | 18568 | 18568 | 19080 | 21384 | 22920 | 24456 | 24456 | 30936 |
| 11 | 18568 | 18568 | 19080 | 19848 | 22152 | 24456 | 24456 | 30936 | 30936 | 32856 |
| 12 | 18568 | 20616 | 22152 | 22920 | 24456 | 24456 | 30936 | 32856 | 34008 | 36696 |
| 13 | 20616 | 22920 | 24456 | 24456 | 30936 | 30936 | 32856 | 36696 | 36696 | 43304 |
| 14 | 22920 | 24456 | 24456 | 30936 | 30936 | 34008 | 36696 | 43304 | 43304 | 45352 |
| 15 | 24456 | 24456 | 30936 | 30936 | 32856 | 36696 | 36696 | 43816 | 45352 | 48936 |
| 16 | 24456 | 30936 | 31704 | 32856 | 35160 | 36696 | 43304 | 46888 | 48936 | 55416 |
| 17 | 30936 | 32856 | 35160 | 36696 | 36696 | 43304 | 45352 | 55416 | 55416 | 59256 |
| 18 | 31704 | 35160 | 36696 | 36696 | 43304 | 46888 | 48936 | 57336 | 59256 | 61176 |
| 19 | 34008 | 36696 | 43304 | 43816 | 46888 | 48936 | 55416 | 61176 | 68040 | 68808 |
| 20 | 36696 | 43304 | 45352 | 46888 | 48936 | 57336 | 59256 | 68808 | 71112 | 73416 |
| 21 | 36696 | 45352 | 48936 | 48936 | 55416 | 61176 | 61176 | 73416 | 73416 | 81176 |
| 22 | 43816 | 48936 | 48936 | 55416 | 59256 | 68040 | 68808 | 80280 | 81176 | 85656 |
| 23 | 45352 | 48936 | 55416 | 57336 | 61176 | 68808 | 73416 | 81176 | 85656 | 92776 |
| 24 | 48936 | 55416 | 59256 | 61176 | 68040 | 73416 | 80280 | 85656 | 92776 | 97896 |
| 25 | 48936 | 57336 | 61176 | 61176 | 68808 | 73416 | 81176 | 92776 | 93800 | 104376 |
| 26 | 59256 | 68040 | 71112 | 73416 | 81176 | 85656 | 93800 | 105528 | 110136 | 119816 |

| | $N_{PRB}$ | | | | |
|---|---|---|---|---|---|
| $I_{TBS}$ | 81 | 90 | 96 | 100 | 108 |
| 0 | 4584 | 5160 | 5352 | 5544 | 5992 |
| 1 | 5992 | 6456 | 6968 | 7224 | 7992 |
| 2 | 7224 | 7992 | 8504 | 9144 | 9528 |
| 3 | 9528 | 10680 | 11064 | 11448 | 12216 |
| 4 | 11448 | 12216 | 12216 | 12216 | 18568 |
| 5 | 12216 | 18568 | 18568 | 18568 | 19080 |
| 6 | 18568 | 19080 | 19848 | 20616 | 22920 |
| 7 | 19848 | 22152 | 23688 | 24456 | 24456 |
| 8 | 22920 | 24456 | 24456 | 30936 | 30936 |
| 9 | 24456 | 30936 | 30936 | 31704 | 34008 |
| 10 | 30936 | 31704 | 34008 | 35160 | 36696 |
| 11 | 32856 | 36696 | 36696 | 36696 | 43816 |
| 12 | 36696 | 43304 | 43816 | 45352 | 48936 |
| 13 | 43304 | 45352 | 48936 | 48936 | 55416 |
| 14 | 45352 | 48936 | 55416 | 57336 | 61176 |
| 15 | 48936 | 55416 | 59256 | 61176 | 68040 |
| 16 | 55416 | 59256 | 61176 | 68040 | 71112 |
| 17 | 59256 | 68040 | 71112 | 73416 | 80280 |
| 18 | 61176 | 71112 | 73416 | 80280 | 84760 |
| 19 | 71112 | 80280 | 81176 | 85656 | 93800 |
| 20 | 73416 | 84760 | 92776 | 93800 | 104376 |
| 21 | 81176 | 92776 | 97896 | 104376 | 110136 |
| 22 | 85656 | 97896 | 104376 | 110136 | 119816 |
| 23 | 93800 | 104376 | 110136 | 117256 | 122376 |
| 24 | 97896 | 110136 | 119816 | 122376 | 133208 |
| 25 | 104376 | 117256 | 122376 | 128984 | 134616 |
| 26 | 119816 | 133208 | 142248 | 154104 | 154104 |

Figure 6:
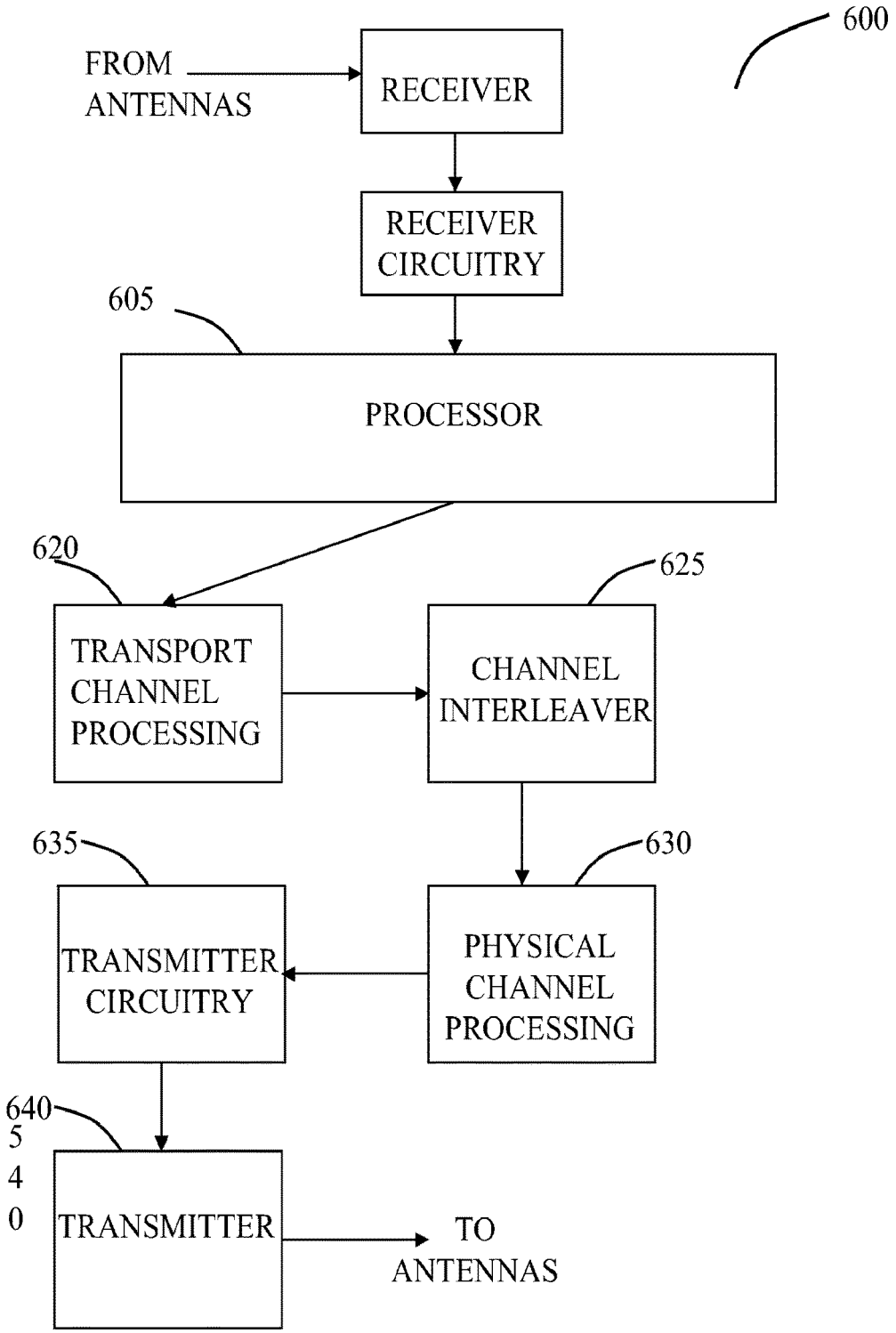
FIG. 6 illustrates a communications device using embodiments of the invention.

FIG. 6 illustrates a communications device 600 in accordance with embodiments of the invention. Communications device 600 may be a base station (or a mobile station) communicating using spatial multiplexing on a DL (or on an UL for a mobile station). Communications device 600 includes a processor 605 that may be used to execute applications and programs. Communications device 600 includes a receive chain and a transmit chain.

The transmit chain of communications device 600 includes a transport channel processing unit 620 that may provide transport channel processing such as applying CRC data to a transport block, segmenting, channel coding, rate matching, concatenating, and so on, to information to be transmitted.

Transmit chain of communications device 600 also includes a channel interleaver 625. Channel interleaver 625 may be implemented as a multi-layer channel interleaver with a plurality of sub-channel interleavers, wherein there may be as many sub-channel interleavers as there are layers that a codeword may be mapped onto. Channel interleaver 625 may follow any of a variety of interleaver, such as a block interleaver, bit reversal interleaver, and so forth, while the sub-channel interleavers may be modulation-symbol or bit level interleavers, for example.

Transmit chain of communications device 600 further includes a physical channel processing unit 630, transmitter circuitry 635, and a transmitter 640. Physical channel processing unit 630 may provide the codeword-to-layer mapping function, such as those described previously. Physical channel processing unit 630 may provide other physical channel processing such as scrambling, modulation/coding scheme selection and mapping, signal generating, and so forth. Transmitter circuitry 635 may provide processing such as parallel to serial converting, amplifying, filtering, and so on. Transmitter 640 may transmit the information to be transmitted using one or more transmit antennas.

Although shown in FIG. 6 as being located immediately ahead of physical channel processing unit 630, channel interleaver 625 may be placed in any of a variety of positions in the transmit chain of communications device 600. Preferably the channel interleaver 625 is placed before a layer mapping unit (part of physical channel processing unit 630). Alternatively it may be placed after the layer mapping unit. In general, the position of channel interleaver 625 may be relatively position independent as long as it achieves the desired interleaving effect together with the layer mapping unit of physical channel processing unit 630.

In various embodiments, the uplink and downlink tables including translation tables described above may be transferred and stored in the communications device 600 prior to beginning of the transmission. Consequently, the receiving device can use the corresponding uplink or downlink tables to determine the transport block size of the received transmission.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitting information, the method comprising:

[processing a downlink transport channel to generate a transport block (TB) having a TB size, wherein the TB size is selected by:]

selecting a modulation and coding scheme index ($I_{TBS}$) and a physical resource block index ($N_{PRB}$), [and]

setting [the] *a transport block* (TB) size for the selected $I_{TBS}$ and $N_{PRB}$ wherein an effective code rate at a user equipment (UE) does not exceed a specified threshold, wherein the effective code rate is defined as a number of downlink (DL) information bits including TB cyclic redundancy check (CRC) bits and code block CRC bits divided by a number of physical channel bits on *a* Physical Downlink Shared Channel (PDSCH);

mapping the transport block to multiple spatial layers, wherein the number of spatial layers N is greater than or equal to three; and transmitting the multiple spatial layers to the UE.

2. The method of claim 1, wherein setting the TB size comprises defining the TB size so that code block sizes with TB CRC bits and code block CRC bits attached are aligned with Quadratic Permutation Polynomial (QPP) sizes for turbo codes.

3. The method of claim 1, wherein the TB size is identical to another entry in an one-layer TB size table or a two-layer TB size table.

4. The method of claim 1, wherein the number of spatial layers N is equal to three, and wherein the setting the TB size for the selected $I_{TBS}$ and $N_{PRB}$ comprises:

selecting the TB size by a ($I_{TBS}$,$3 \cdot N_{PRB}$) entry of a one-layer TBS table if $1 \leq N_{PRB} \leq 36$; and selecting the TB size from a translation table if $37 \leq N_{PRB} \leq N_{MAX}$, wherein $N_{MAX}$ is the maximum number of physical resource blocks that can be allocated.

5. The method of claim 4, wherein the translation table comprises translations from a one-layer TB size to a three-layer TB size.

6. The method of claim 4, wherein the translation table is obtained by:

obtaining a one-layer TB size (TBS_L1) by selecting a ($I_{TBS}$,$N_{PRB}$) entry from the one-layer TBS table and calculating 3×TBS_L1; and obtaining a three-layer TB size (TBS_L3) by selecting the TB size in the one-layer table or a two-layer table that is most adjacent to a calculated 3×TBS_L1.

7. The method of claim 6, wherein if the calculated 3×TBS_L1 is larger than all entries in the one-layer and two-layer table, the three-layer TB size is selected to be 3×TBS_L1 with adjustments for CRC bits and alignment with Quadratic Permutation Polynomial (QPP) sizes for turbo coding.

8. The method of claim 4, wherein if $N_{PRB}$={38, 40, 42, 44, 46, 48, 50, 52, 54, 56, 58, 60, 62, 64, 66, 68, 70, 72} and $0 \leq I_{TBS} \leq 25$, the TB size is selected by a $$\left(I_{TBS}, \frac{3 \cdot N_{PRB}}{2}\right)$$

entry in an equivalent 27×110 two-layer TBS table constructed by a one-layer to two-layer TB size translation table.

9. The method of claim 4, further comprising receiving the transmitted multiple spatial layers at the UE, and using the one-layer TBS table, or the translation table to determine a transmitted size of the transport block.

10. The method of claim 4, wherein the translation table is

| TBS_L1 | TBS_L3 |
|---|---|
| 1032 | 3112 |
| 1064 | 3240 |
| 1096 | 3240 |
| 1128 | 3368 |
| 1160 | 3496 |
| 1192 | 3624 |
| 1224 | 3624 |
| 1256 | 3752 |
| 1288 | 3880 |
| 1320 | 4008 |
| 1352 | 4008 |
| 1384 | 4136 |
| 1416 | 4264 |
| 1480 | 4392 |
| 1544 | 4584 |
| 1608 | 4776 |
| 1672 | 4968 |
| 1736 | 5160 |
| 1800 | 5352 |
| 1864 | 5544 |
| 1928 | 5736 |
| 1992 | 5992 |
| 2024 | 5992 |
| 2088 | 6200 |
| 2152 | 6456 |
| 2216 | 6712 |
| 2280 | 6712/6968 |
| 2344 | 6968 |
| 2408 | 7224 |
| 2472 | 7480 |
| 2536 | 7480/7736 |
| 2600 | 7736 |
| 2664 | 7992 |
| 2728 | 8248 |
| 2792 | 8248/8504 |
| 2856 | 8504 |
| 2984 | 8760/9144 |
| 3112 | 9144/9528 |
| 3240 | 9528/9912 |
| 3368 | 9912/10296 |
| 3496 | 10296/10680 |
| 3624 | 10680/11064 |
| 3752 | 11064/11448 |
| 3880 | 11448/11832 |
| 4008 | 11832/12216 |
| 4136 | 12576 |
| 4264 | 12960 |
| 4392 | 12960 |
| 4584 | 13536 |
| 4776 | 14112 |
| 4968 | 14688 |
| 5160 | 15264 |
| 5352 | 15840 |
| 5544 | 16416 |
| 5736 | 16992 |
| 5992 | 18336 |
| 6200 | 18336 |
| 6456 | 19080 |
| 6712 | 19848 |
| 6968 | 20616 |
| 7224 | 21384 |
| 7480 | 22152 |
| 7736 | 22920 |
| 7992 | 23688 |
| 8248 | 24496 |
| 8504 | 25456 |
| 8760 | 26416 |
| 9144 | 27376 |
| 9528 | 28336 |
| 9912 | 29296 |
| 10296 | 30576 |
| 10680 | 31704 |
| 11064 | 32856 |

-continued

| TBS_L1 | TBS_L3 |
|---|---|
| 11448 | 34008 |
| 11832 | 35160 |
| 12216 | 36696 |
| 12576 | 37888 |
| 12960 | 39232 |
| 13536 | 40576 |
| 14112 | 42368 |
| 14688 | 43816 |
| 15264 | 45352 |
| 15840 | 46888 |
| 16416 | 48936 |
| 16992 | 51024 |
| 17568 | 52752 |
| 18336 | 55056 |
| 19080 | 57336 |
| 19848 | 59256 |
| 20616 | 61664 |
| 21384 | 63776 |
| 22152 | 66592 |
| 22920 | 68808 |
| 23688 | 71112 |
| 24496 | 73712 |
| 25456 | 76208 |
| 26416 | 78704 |
| 27376 | 81176 |
| 28336 | 84760 |
| 29296 | 87936 |
| 30576 | 90816 |
| 31704 | 93800 |
| 32856 | 97896 |
| 34008 | 101840 |
| 35160 | 105528 |
| 36696 | 110136 |
| 37888 | 115040 |
| 39232 | 119816 |
| 40576 | 119816 |
| 42368 | 128496 |
| 43816 | 133208 |
| 45352 | 137792 |
| 46888 | 142248 |
| 48936 | 146856 |
| 52752 | 157432 |
| 55056 | 165216 |
| 57336 | 171888 |
| 59256 | 177816 |
| 61664 | 185728 |
| 63776 | 191720 |
| 66592 | 199824 |
| 68808 | 205880 |
| 71112 | 214176. |

11. The method of claim 1, wherein the number of spatial layers N is equal to four, and wherein the setting the TB size for the selected $I_{TBS}$ and $N_{PRB}$ comprises:

selecting the TB size from a translation table if $56 \leq N_{PRB} \leq N_{MAX}$, wherein $N_{MAX}$ is the maximum number of physical resource blocks that can be allocated.

12. The method of claim 11, wherein the translation table is

| TBS_L1 | TBS_L4 | TBS_L1 | TBS_L4 |
|---|---|---|---|
| 1544 | 6200 | | |
| 1608 | 6456 | 3880 | 15264 |
| 1672 | 6712 | 4008 | 15840 |
| 1736 | 6968 | 4136 | 16416 |
| 1800 | 7224 | 4264 | 16992 |
| 1864 | 7480 | 4392 | 17568 |
| 1928 | 7736 | 4584 | 18336 |
| 1992 | 7992 | 4776 | 19080 |
| 2024 | 7992 | 4968 | 19848 |
| 2088 | 8248 | 5160 | 20616 |
| 2152 | 8504 | 5352 | 21384 |
| 2216 | 8760 | 5544 | 22152 |

-continued

| TBS_L1 | TBS_L4 | TBS_L1 | TBS_L4 |
|---|---|---|---|
| 2280 | 9144 | 5736 | 22920 |
| 2344 | 9528 | 5992 | 23688 |
| 2408 | 9528 | | |
| 2472 | 9912 | 6456 | 25456 |
| 2536 | 10296 | | |
| 2600 | 10296 | 6968 | 28336 |
| 2664 | 10680 | 7224 | 29296 |
| 2728 | 11064 | 7480 | 29296 |
| 2792 | 11064 | 7736 | 30576 |
| 2856 | 11448 | 7992 | 31704 |
| 2984 | 11832 | 8248 | 32856 |
| 3112 | 12576 | 8504 | 34008 |
| 3240 | 12960 | 8760 | 35160 |
| 3368 | 13536 | 9144 | 36696 |
| 3496 | 14112 | 9528 | 37888 |
| 3624 | 14688 | 9912 | 39232 |
| 10296 | 40576 | 28336 | 115040 |
| 10680 | 42368 | | |
| 11064 | 43816 | 30576 | 124464 |
| 11448 | 45352 | 31704 | 128496 |
| 11832 | 46888 | 32856 | 133208 |
| 12216 | 48936 | 34008 | 137792 |
| 12576 | 51024 | 35160 | 142248 |
| 12960 | 51024 | 36696 | 146856 |
| 13536 | 55056 | | |
| 14112 | 57336 | 39232 | 157432 |
| 14688 | 59256 | 40576 | 161760 |
| 15264 | 61664 | 42368 | 169544 |
| 15840 | 63776 | 43816 | 175600 |
| 16416 | 66592 | 45352 | 181656 |
| 16992 | 68808 | 46888 | 187712 |
| 17568 | 71112 | 48936 | 195816 |
| 18336 | 73712 | 51024 | 203704 |
| 19080 | 76208 | 52752 | 211936 |
| 19848 | 78704 | 55056 | 220296 |
| 20616 | 81176 | 57336 | 230104 |
| 21384 | 84760 | | |
| 22152 | 87936 | | |
| 22920 | 90816 | | |
| 23688 | 93800 | 66592 | 266440 |
| 24496 | 97896 | | |
| 25456 | 101840 | 71112 | 284608 |
| 26416 | 105528 | | |
| 27376 | 110136. | | |

13. The method of claim 11, wherein the translation table comprises translations from a one-layer TB size to a four-layer TB size.

14. The method of claim 11, wherein the translation table is obtained by:

locating a two-layer TB size (TBS_L2(i)) for an one-layer TB size (TBS_L1(i)) in an $i^{th}$ row of an one-layer to two-layer translation table, the TBS_L1(i) being an ($I_{TBS}$,$N_{PRB}$) entry of an one-layer TBS table;

in a $j^{th}$ row of the one-layer to two-layer translation table identifying an one-layer TB size (TBS_L1(j)) having a TB size equal to TBS_L2(i)); and setting the four-layer TB size for the $i^{th}$ row in the one-layer to four-layer translation to the two-layer TB size of the $j^{th}$ row (TBS_L2(j)).

15. The method of claim 14, wherein the four-layer TB size for the $i^{th}$ row in the one-layer to four-layer translation is set to 2×TBS_L2(i) with adjustment for CRC bit and alignment with QPP sizes for turbo codes if no one-layer TB size (TBS_L1(j)) has a TB size equal to TBS_L2(i)).

16. The method of claim 11, wherein the translation table is

| TBS_L1 | TBS_L4 |
|---|---|
| 3752 | 15264 |
| 6200 | 24496 |
| 6712 | 26416 |
| 29296 | 115040 |
| 37888 | 151376 |
| 59256 | 236160 |
| 61664 | 245648 |
| 63776 | 254328 |
| 68808 | 275376. |

17. A communications device comprising:

a transmitter to be coupled to at least one transmit antenna, the transmitter configured to transmit signals with the at least one transmit antenna;

a transport channel [processing unit coupled to a] processor, the transport channel [processing unit] *processor* configured to [provide transport channel processing to a transport block (TB) provided by the processor, wherein a TB size of the TB is selected by]:

[selecting] *select* a modulation and coding scheme index ($I_{TBS}$) and a physical resource block index ($N_{PRB}$), and

[selecting the] *select a transport block* (TB) size for the selected $I_{TBS}$ and $N_{PRB}$, wherein the effective code rate for a user equipment (UE) does not exceed a specified threshold for the selected TB size, wherein the effective code rate is defined as the number of downlink (DL) information bits including TB cyclic redundancy check (CRC) bits and code block CRC bits divided by the number of physical channel bits on *a* Physical Downlink Shared Channel (PDSCH); and a physical channel [processing unit] *processor* coupled to the transmitter, the physical channel [processing unit] *processor* configured to provide physical channel processing to a plurality of transport blocks provided by the transport channel [processing unit] *processor*.

18. The communications device of claim 17, wherein the transport channel processing comprises appending error check data to a transport block, segmenting, channel coding, rate matching, concatenating, or a combination thereof.

19. The communications device of claim 17, wherein the physical channel processing comprises scrambling, modulation/coding scheme selection, codeword-to-layer mapping, signal generating, or a combination thereof.

20. The communications device of claim 17, wherein the physical channel [processing unit] *processor* is further configured to map a transport block of the plurality of transport blocks to multiple spatial layers, wherein the number of spatial layers N is greater than or equal to three.

21. A communications device comprising:

a transmitter to be coupled to at least one transmit antenna, the transmitter configured to transmit signals with the at least one transmit antenna;

a [processing unit to process a downlink transport channel to generate a transport block (TB) having a TB size, wherein the processing unit is] *processor* configured to [select the TB size by]:

[selecting] *select* a modulation and coding scheme index ($I_{TBS}$) and a physical resource block index ($N_{PRB}$), and

[setting the] *set a transport block* (TB) size for the selected $I_{TBS}$ and $N_{PRB}$ wherein an effective code rate for a user equipment (UE) does not exceed a specified threshold, wherein the effective code rate is defined as a number of downlink (DL) information bits including TB cyclic redundancy check (CRC) bits and code block CRC bits divided by a number of physical channel bits on *a* Physical Downlink Shared Channel (PDSCH); and a layer [mapping unit] *mapper* to map the transport block to multiple spatial layers, wherein the number of spatial layers N is greater than or equal to three, wherein the transmitter is configured to transmit the multiple spatial layers to the UE.

22. The communications device of claim 21, wherein setting the TB size comprises defining the TB size so that code block sizes with TB CRC bits and code block CRC bits attached are aligned with Quadratic Permutation Polynomial (QPP) sizes for turbo codes.

23. The communications device of claim 21, wherein the TB size is identical to another entry in an one-layer TB size table or a two-layer TB size table.

24. The communications device of claim 21, wherein the number of spatial layers N is equal to three, and wherein the setting the TB size for the selected $I_{TBS}$ and $N_{PRB}$ comprises:

selecting the TB size by a $(I_{TBS}, 3 \cdot N_{PRB})$ entry of a one-layer TBS table if $1 \leq N_{PRB} \leq 36$; and selecting the TB size from a translation table if $37 \leq N_{PRB} \leq N_{MAX}$, wherein $N_{MAX}$ is the maximum number of physical resource blocks that can be allocated.

25. The communications device of claim 24, wherein the translation table comprises translations from a one-layer TB size to a three-layer TB size.

26. The communications device of claim 24, wherein the translation table is obtained by:

obtaining a one-layer TB size (TBS_L1) by selecting a $(I_{TBS}, N_{PRB})$ entry from the one-layer TBS table and calculating 3×TBS_L1; and obtaining a three-layer TB size (TBS_L3) by selecting the TB size in the one-layer table or a two-layer table that is most adjacent to a calculated 3×TBS_L1.

27. The communications device of claim 26, wherein if the calculated 3×TBS_L1 is larger than all entries in the one-layer and two-layer table, the three-layer TB size is selected to be 3×TBS_L1 with adjustments for CRC bits and alignment with Quadratic Permutation Polynomial (QPP) sizes for turbo coding.

28. The communications device of claim 24, wherein if $N_{PRB}$={38, 40, 42, 44, 46, 48, 50, 52, 54, 56, 58, 60, 62, 64, 66, 68, 70, 72} and $0 \leq I_{TBS} \leq 25$, the TB size is selected by a $$\left(I_{TBS}, \frac{3 \cdot N_{PRB}}{2}\right)$$

entry in an equivalent 27×110 two-layer TBS table constructed by a one-layer to two-layer TB size translation table.

29. The communications device of claim 21, wherein the number of spatial layers N is equal to four, and wherein the setting the TB size for the selected $I_{TBS}$ and $N_{PRB}$ comprises selecting the TB size from a translation table if $56 \leq N_{PRB} \leq N_{MAX}$, wherein $N_{MAX}$ is the maximum number of physical resource blocks that can be allocated.

30. The communications device of claim 29, wherein the translation table comprises translations from a one-layer TB size to a four-layer TB size.

31. The communications device of claim 29, wherein the translation table is obtained by:

locating a two-layer TB size (TBS_L2(i)) for an one-layer TB size (TBS_L1(i)) in an $i^{th}$ row of an one-layer to two-layer translation table, the TBS_L1(i) being an $(I_{TBS}, N_{PRB})$ entry of an one-layer TBS table;

in a $j^{th}$ row of the one-layer to two-layer translation table identifying an one-layer TB size (TBS_L1(j)) having a TB size equal to TBS_L2(i)); and setting the four-layer TB size for the $i^{th}$ row in the one-layer to four-layer translation to the two-layer TB size of the $j^{th}$ row (TBS_L2(j)).

32. The communications device of claim 31, wherein the four-layer TB size for the $i^{th}$ row in the one-layer to four-layer translation is set to 2×TBS_L2(i) with adjustment for CRC bit and alignment with QPP sizes for turbo codes if no one-layer TB size (TBS_L1(j)) has a TB size equal to TBS_L2(i)).

*33. A method for transmitting information, the method comprising:*

*selecting a modulation and coding scheme index (ITBS) and a physical resource block index (NPRB) for a transport block (TB), and*

*setting the TB size for the selected ITBS and NPRB wherein an effective code rate at a user equipment (UE) does not exceed a specified threshold, wherein the effective code rate is defined as a number of downlink (DL) information bits including TB cyclic redundancy check (CRC) bits and code block CRC bits divided by a number of physical channel bits on Physical Downlink Shared Channel (PDSCH);*

*mapping the transport block to multiple spatial layers, wherein the number of spatial layers N is greater than or equal to three; and*

*transmitting the multiple spatial layers to the UE, wherein the number of spatial layers N is equal to three, and wherein the setting the TB size for the selected ITBS and NPRB comprises:*

*selecting the TB size by a $(I_{TBS}, 3 \cdot N_{PRB})$ entry of a one-layer TBS table if $1 \leq NPRB \leq 36$; and*

*selecting the TB size from a translation table if $37 \leq NPRB \leq NMAX$, wherein NMAX is the maximum number of physical resource blocks that can be allocated.*

*34. The method of claim 33, wherein the translation table comprises:*

| *TBS_L1* | *TBS_L3* |
|---|---|
| *1032* | *3112* |
| *1064* | *3240* |
| *1096* | *3240* |
| *1128* | *3368* |
| *1160* | *3496* |
| *1192* | *3624* |
| *1224* | *3624* |
| *1256* | *3752* |
| *1288* | *3880* |
| *1320* | *4008* |
| *1352* | *4008* |
| *1384* | *4136* |
| *1416* | *4264* |
| *1480* | *4392* |
| *1544* | *4584.* |

*35. The method of claim 33, wherein the translation table comprises:*

| *TBS_L1* | *TBS_L3* |
|---|---|
| *3752* | *11064/11448* |
| *3880* | *11448/11832* |

-continued

| TBS_L1 | TBS_L3 |
|---|---|
| 4008 | 11832/12216 |
| 4136 | 12576 |
| 4264 | 12960 |
| 4392 | 12960 |
| 4584 | 13536 |
| 4776 | 14112 |
| 4968 | 14688 |
| 5160 | 15264 |
| 5352 | 15840 |
| 5544 | 16416. |

*36. The method of claim 33, wherein the translation table is*

| TBS_L1 | TBS_L3 |
|---|---|
| 16992 | 51024 |
| 17568 | 52752 |
| 18336 | 55056 |
| 19080 | 57336 |
| 19848 | 59256 |
| 20616 | 61664 |
| 21384 | 63776 |
| 22152 | 66592 |
| 22920 | 68808. |

*37. The method of claim 33, wherein the translation table comprises*

| TBS_L1 | TBS_L3 |
|---|---|
| 1544 | 4584 |
| 1608 | 4776 |
| 1672 | 4968 |
| 1736 | 5160 |
| 1800 | 5352 |
| 1864 | 5544 |
| 1928 | 5736 |
| 1992 | 5992. |

*38. The method of claim 33, wherein the translation table is*

| TBS_L1 | TBS_L3 |
|---|---|
| 27376 | 81176 |
| 28336 | 84760 |
| 29296 | 87936 |

-continued

| TBS_L1 | TBS_L3 |
|---|---|
| 30576 | 90816 |
| 31704 | 93800 |
| 32856 | 97896 |
| 34008 | 101840 |
| 35160 | 105528 |
| 36696 | 110136 |
| 37888 | 115040. |

*39. The method of claim 33, wherein setting the TB size comprises defining the TB size so that code block sizes with TB CRC bits and code block CRC bits attached are aligned with Quadratic Permutation Polynomial (QPP) sizes for turbo codes.*

*40. The method of claim 33, wherein the TB size is identical to another entry in an one-layer TB size table or a two-layer TB size table.*

*41. A user equipment (UE) comprising:*

*a transmitter to be coupled to at least one transmit antenna, the transmitter configured to transmit signals with the at least one transmit antenna;*

*a processor configured to select a transport block (TB) size by:*

*selecting a modulation and coding scheme index (ITBS) and a physical resource block index (NPRB), and*

*setting the TB size for the selected ITBS and NPRB wherein an effective code rate for a communications device does not exceed a specified threshold, wherein the effective code rate is defined as a number of downlink (DL) information bits including TB cyclic redundancy check (CRC) bits and code block CRC bits divided by a number of physical channel bits on Physical Downlink Shared Channel (PDSCH); and*

*a layer mapper to map the transport block to multiple spatial layers, wherein the number of spatial layers N is greater than or equal to three, wherein the transmitter is configured to transmit the multiple spatial layers to the communications device.*

*42. The UE of claim 41, wherein setting the TB size comprises defining the TB size so that code block sizes with TB CRC bits and code block CRC bits attached are aligned with Quadratic Permutation Polynomial (QPP) sizes for turbo codes.*

*43. The UE of claim 41, wherein the TB size is identical to another entry in an one-layer TB size table or a two-layer TB size table.*

* * * * *